US012579974B1

(12) United States Patent
Lu et al.

(10) Patent No.: US 12,579,974 B1
(45) Date of Patent: Mar. 17, 2026

(54) CACHE TECHNIQUES FOR LARGE LANGUAGE MODEL PROCESSING

(71) Applicant: Amazon Technologies, Inc., Seattle, WA (US)

(72) Inventors: Sixing Lu, Bellevue, WA (US); Xiaocheng Deng, Sammamish, WA (US); Yicheng Wang, Seattle, WA (US); Chengyuan Ma, Bellevue, WA (US); Gang Chen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 18/452,861

(22) Filed: Aug. 21, 2023

(51) Int. Cl.
| | |
|---|---|
| *G10L 15/183* | (2013.01) |
| *G10L 15/18* | (2013.01) |
| *G10L 15/22* | (2006.01) |
| *G10L 15/32* | (2013.01) |

(52) U.S. Cl.
CPC ........ *G10L 15/183* (2013.01); *G10L 15/1815* (2013.01); *G10L 15/22* (2013.01); *G10L 15/32* (2013.01)

(58) Field of Classification Search
CPC ............. G06F 11/3447; G06F 16/3329; G06F 16/9536; G06F 40/242; G06F 40/274; G06F 40/295; G06F 40/35; G06F 16/345; G06F 16/90332; G06F 40/237; G06N 3/084; G06N 3/0895; G06N 20/00; G10L 15/1815; G10L 15/183; G10L 15/22;

G10L 15/32; G10L 15/02; G10L 15/197; G10L 15/26; H04M 3/4936; G06Q 30/02; G06Q 50/18; G16H 80/00; H04L 63/10
See application file for complete search history.

(56) References Cited

U.S. PATENT DOCUMENTS

| | | | | |
|---|---|---|---|---|
| 8,041,568 B2 * | 10/2011 | Strope | ................. | H04M 3/4936 704/275 |
| 8,612,225 B2 * | 12/2013 | Arakawa | ................. | G10L 15/02 704/226 |
| 8,938,391 B2 * | 1/2015 | Zweig | ................... | G10L 15/197 704/251 |
| 11,626,107 B1 * | 4/2023 | Hajebi | ................... | G06F 40/295 704/235 |
| 11,763,816 B1 * | 9/2023 | Sundararaman | ........ | G10L 15/26 704/257 |
| 12,008,332 B1 * | 6/2024 | Gardner | ............... | G06F 16/345 |
| 12,014,276 B2 * | 6/2024 | Mishra | ................... | G06N 3/084 |

(Continued)

*Primary Examiner* — Gerald Gauthier
(74) *Attorney, Agent, or Firm* — Pierce Atwood LLP

(57) ABSTRACT

Techniques for cache management for LLM processing are described. Example embodiments include a signal hashing model that generates a key for particular context data. An LLM output corresponding to the context data is stored in a cache along with the key. For a user input received by the system, a cache lookup is performed using a key for context data corresponding to the received user input. For a cache hit, the stored output is used to respond to the user input. For a cache miss, a LLM processes the context data and the user input to generate an output within a first timeout. If the LLM is unable to generate an output within the first timeout, then in some cases, the LLM is allowed to continue processing until a second timeout, and a final or partial output from the LLM is stored in the cache.

20 Claims, 15 Drawing Sheets

(56) References Cited

U.S. PATENT DOCUMENTS

| 2008/0052078 | A1* | 2/2008 | Bennett ................. G06F 40/237 704/E15.024 |
|---|---|---|---|
| 2009/0326947 | A1* | 12/2009 | Arnold ................... G06Q 30/02 707/999.005 |
| 2011/0208522 | A1* | 8/2011 | Pereg ..................... G06F 40/35 704/235 |
| 2022/0139384 | A1* | 5/2022 | Wu ......................... G06F 40/35 704/257 |
| 2023/0074406 | A1* | 3/2023 | Baeuml ............. G06F 16/90332 |
| 2024/0005917 | A1* | 1/2024 | Tian ......................... G10L 15/22 |
| 2024/0031367 | A1* | 1/2024 | Pringle .................. H04L 63/10 |
| 2024/0256582 | A1* | 8/2024 | Jain ..................... G06F 16/3329 |
| 2024/0266074 | A1* | 8/2024 | Smurro ................. G16H 80/00 |
| 2024/0345551 | A1* | 10/2024 | Ramanasankaran ......................... G06N 3/0895 |
| 2024/0370691 | A1* | 11/2024 | Devaux .............. G06F 16/9536 |
| 2024/0411824 | A1* | 12/2024 | Sahu .................... G06F 40/274 |
| 2024/0428173 | A1* | 12/2024 | Ahmadia ........... G06F 11/3447 |
| 2025/0005285 | A1* | 1/2025 | Hugues-Nuger ..... G06F 40/242 |
| 2025/0037222 | A1* | 1/2025 | Oluleye ................ G06Q 50/18 |

* cited by examiner

400

— 500

502

RECEIVE FREQUENT
USER INPUT DATA

504

RECEIVE CACHE
METADATA

506

RECEIVE HISTORIC
CACHE USAGE DATA

508

PROCESS, USING ML MODEL, USER INPUT DATA, CONTEXT
DATA, AND FREQUENT USER INPUT DATA TO DETERMINE
CACHE REFRESH INDICATOR

FIG. 14

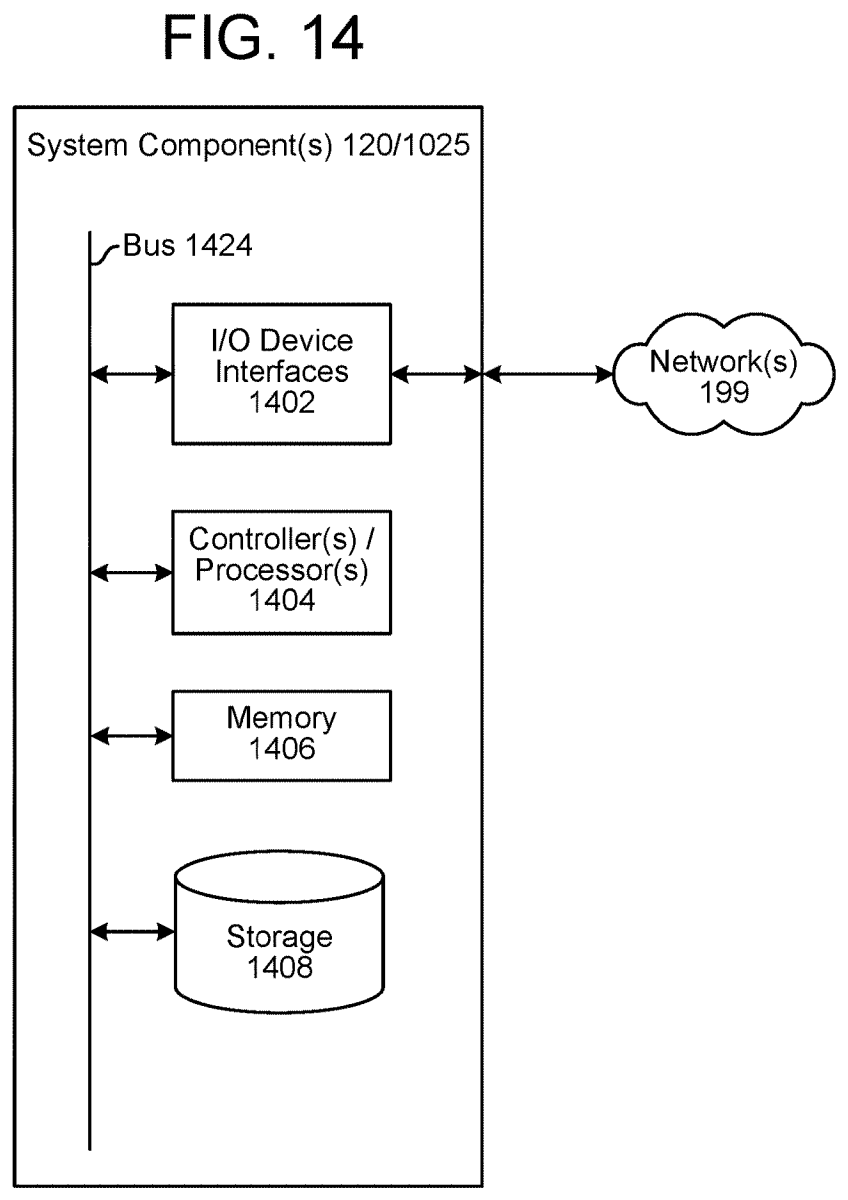

System Component(s) 120/1025

Bus 1424

I/O Device Interfaces 1402

Controller(s) / Processor(s) 1404

Memory 1406

Storage 1408

Network(s) 199

CACHE TECHNIQUES FOR LARGE LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 14 is a block diagram conceptually illustrating example components of a system according to embodiments of the present disclosure.

DETAILED DESCRIPTION

Figure 1:
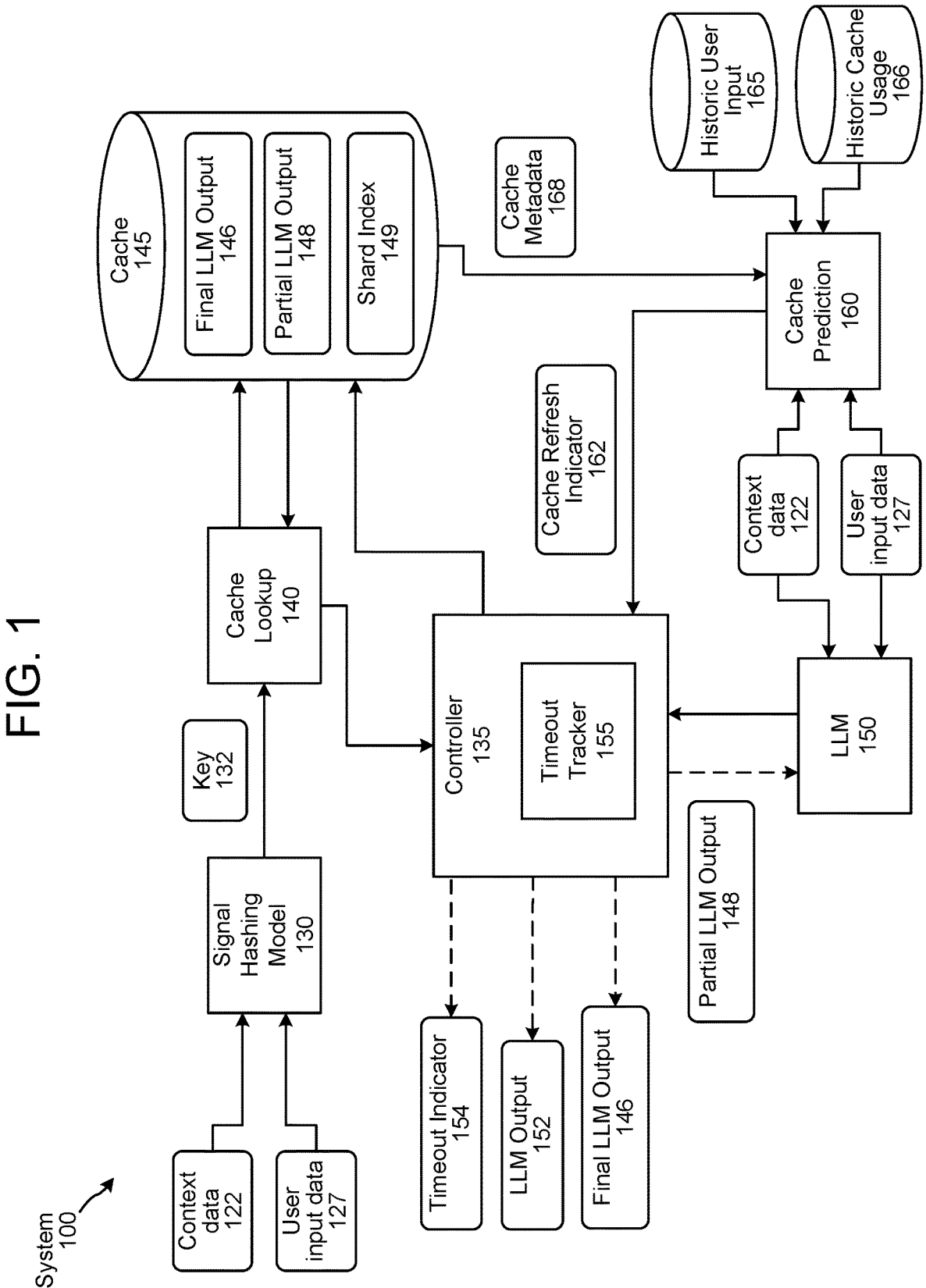
FIG. 1 is a conceptual diagram illustrating an example system for cache management for large language model inference, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

Language modeling (LM) is the use of various statistical and probabilistic techniques to determine the probability of a given sequence of words occurring in a sentence. LM can be used to perform various tasks including generative tasks that involve generating data rather than discriminating between given classes. Language models analyze bodies of text data to provide a basis for their word predictions. The language models are generative models. In some embodiments, the language models may be a large language model (LLM). An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some embodiments, the system may be configured to process the ASR data (or other type of data representing another type of user input) using one or more language models (e.g., one or more large language models (LLMs)) to determine the action responsive to the user input. For example, in response to the user input "Please plan a 4-person trip to [Location] from [Date 1] to [Date 2]," the system may determine that the user wants to book a trip to [Location] during the specified dates. Thereafter, the system may use the language model(s) to generate one or more tasks associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

The language model(s) may generate an output indicating one or more application programming interface (API) calls requesting that the one or more components return a description of the action(s) they are configured to/will perform with respect to the user input and/or current task. As used herein, an "API call" is an instruction/request for the corresponding API to perform a particular action (e.g., an API call of turn_on_device (device="indoor light 1") corresponds to an instruction/request to an API to turn on a device associated with the identifier "indoor light 1"). The system may execute the API calls and the language model(s) may determine that a first component (e.g., a travel booking website) of the one or more components is configured to perform an action responsive to the user input/task. The system may then perform as discussed herein above with respect to a next task (e.g., find a hotel in [Location] between [Date 1] and [Date 2]) of the one or more tasks. Thereafter, the language model(s) may determine that one or more components have been selected to perform the action(s) responsive to the user input, generate a response informing the user of the actions to be performed, and, with authorization, cause the one or more components to perform the action(s).

The present disclosure provides techniques for using a cache for LLM processing to reduce latency and decrease use of computational resources. A system of the present disclosure may include a signal hashing model that generates a unique key for particular context data. In some embodiments, the context data may include device information for a device that receives a user input, time information for when a user input is received, a previous user input(s) of the dialog session, and other information corresponding to the user, device, or user environment. An LLM output corresponding to the context data, which may be determined by the LLM via prior processing of the context data (that may be determined for a different previous interaction), may be stored in a cache along with the unique key. For an incoming user input, a cache lookup may performed using a key for context data corresponding to the user input. For a cache hit, the stored output can be used to respond to the user input. A cache hit, as used herein, can mean that the LLM has already previously processed a user input corresponding to the same context data (e.g., a user input received under the same or similar circumstances), and the system can use the previously determined output (stored in the cache) to respond to the current user input that corresponds to the same context data. For a cache miss, the LLM may process the context data and the user input to generate an output, as a previously determined output is not available for the particular context data.

In some embodiments, the system only uses context data, not the user input, to determine whether an LLM output is available. For example, the system may determine based on the context data (e.g., time of day, prior dialog turns, etc.) that the user will provide the particular user input. If the system waits to receive the user input (e.g., waits for ASR processing to be completed), then latency may increase. Thus, the system can provide additional latency reduction by using the context data to track previously determined LLM output (e.g., using the context data as a key for the cache). If a previously determined LLM output is not available for the context data, then the system processes the user input and the context data using the LLM. Thus, the system only executes the LLM (which can be time and resource consuming) if previously determined LLM output is not available for a particular situation/context data.

In some embodiments, the system may track a first timeout within which the LLM is to generate an output. If the LLM cannot generate an output by the first timeout (before the first timeout has elapsed), then another component(s) may be used to process and respond to the user input. In some embodiments, after the first timeout, the system may continue processing using the LLM to attempt to generate an output by a second timeout. If an output is generated before the second timeout (before the second timeout has elapsed), the output, which may be referred to as a final output, may be stored in the cache associated with the key for the context data. If the second timeout occurs and an output has not been generated, then a partial output of the LLM may be stored in the cache associated with the key for the context data. The partial output may be used in the future by the LLM to continue processing.

In some embodiments, the system may continue processing using the LLM after the first timeout if the system determines that it is beneficial to store an output corresponding to the context data and/or the user input being processed by the LLM. The system may use a cache prediction component to determine whether or not an LLM output is to be stored, where such determination may be based on various factors, such as, a frequency of the system receiving the user input, an inference/processing time for the user input, cache size, and the like.

Teachings of the present disclosure provide, among other things, reduction in latency and use of computational resources when processing using a LLM. The system can use a stored output to respond to a user input. In other cases, the system can use a partial LLM output to process with respect to a user input so that the LLM is not processing from a beginning point but rather continues processing from the previous stopping point. In yet other cases, the system can store LLM outputs for certain types of situations/context data (e.g., frequently received user inputs) for use in the future.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system 100 for cache management for large language model inference, according to embodiments of the present disclosure. The system 100 may include a signal hashing model 130, a cache lookup component 140, a cache 145, a controller 135, a large language model (LLM) 150, and a cache prediction component 160. The system 100 may process user input data 127 representing a user input from a user 105 (shown in FIG. 6). The user input data 127 may be a natural language input and may be provided by the user 105 as a spoken input or a typed input. The user 105 may provide a different type of input, such as selection of a GUI element via a screen of a user device 110, actuation of a button on the user device 110, a gesture input, etc., and such input(s) may be converted to a natural language representation. The user input data 127, in some embodiments, may be text data or ASR data (ASR hypothesis associated with a confidence score).

The system 100 may also process context data 122. The context data 122 may correspond to the user input represented in the user input data 127. In some embodiments, the context data 122 may include device information for the user device 110 that receives the user input, for example, device identifier, device type, device name, device location, device capabilities, device status, device state, etc. The context data 122 may include time, date, day (e.g., Monday, weekend, etc.), week (first week of the month, $24^{th}$ week of the year, etc.), month, etc. information for when the user input is received. The context data 122 may include user profile information which may be determined using a user or profile identifier that may be determined as described herein in relation to a user recognition component 1095. The user profile information may include, for example, user preferences, components enabled for the user account (e.g., skills, APIs, LLM-based agents, etc.), functionalities enabled for the user account (e.g., brief response mode, follow-up mode to enable wakeword-free interactions, etc.), user demographics, past user interactions, other user devices 110 associated with the user account, etc.

In some embodiments, the user input data 127 represents a user input of a dialog session, where the user input is received subsequent to a prior user input of the dialog session. In such embodiments, the context data 122 may include data (e.g., text data or ASR data) representing the prior user input(s) of the dialog session. In some embodiments, the context data 122 may also include data representing a system response corresponding to the prior user input (e.g., an identifier for a component used to respond to the prior user input, output presented in response to the prior user input, etc.).

The context data 122 may be historical context, which may be the context data generated more than 24 hours from the current user interaction/session. The historical context may be accumulated in a relatively longer time window, and may also be the re-generated output from models offline. For example, historical context may be a list of media items that a user listened to or viewed in the past month.

The context data 122 may be dynamic context, which may be the context data generated during the current user interaction/session. It may dynamically update session by session even for a single user. For example, dynamic context may be a previous utterance in the same dialog session.

The context data 122 may be dialog context, which may be the context data of a dialog in the current user interaction/session, and may include user inputs and corresponding system responses. For example, the dialog context may be: {[user]: "continue", [system]: continue playing music"; [user]"volume three" [system] set volume to level three}.

The context data 122 may be situational context, which may be the context data related to the situation of the current user input, and may include what the user 105 can see or hear. For example, situational context may be status of device(s), user profile, text or images on-screen, etc.

The context data 122 may be environment setting, which may be static information (low variability) and may represent settings used for processing. For example, environment setting may be locale, language, etc.

The context data 122 may be discourse history, which may be context information of the current turn of the dialog. In some embodiments, discourse history may be used by an alternative input representation component to generate an utterance/query rewrite. For example, the discourse history may be requestUtterance, reformulatedUtterance, responseUtterance, timestamp, etc.

The signal hashing model 130 may be configured to compress and map the context data 122 (which may be long and noisy) to a unique hashing key that can be used for a cache lookup (or cache storage). The signal hashing model 130 may capture dynamic context information and transform it into a compressed key. The inference latency of the signal hashing model 130, in some embodiments, can be hidden or is relatively small, since the context data 122 is usually available before the current user input represented in the user input data 127.

The signal hashing model 130 may be a machine learning model. The signal hashing model 130 may be a sequence-to-sequence (seq2seq) type model.

Considering a LLM's ability to intake rich contextual signals (e.g., previous customer dialogue, user interaction history, environmental context, etc.), caching the model output may be a challenging task. This is because the diverse nature of such contextual inputs can result in an explosion of cache key size, leading to frequent cache refresh costs. In some embodiments, the signal hashing model 130 is optimized toward maximizing compression rate and minimizing the collision rate without worrying about decrypting (or recovering) the original semantics back; but not optimized toward minimizing the information loss as a summarization model. The context input into the signal hashing model 130 may not be limited to a single modality or format, and the output format of the signal hashing model 130 may not be limited to a string key, for example, it can also be a codebook.

In some embodiments, the signal hashing model 130 may generate a key uniquely corresponding to the context data 122 and the user input data 127, based on for example a combination of the context data 122 and the user input data 127, and compressing and mapping the combined data to the key.

In some embodiments, the cache 145 may be used to store query rewrites corresponding to user inputs. In such cases, here are some examples of input data to the signal hashing model 130, corresponding key 132 and corresponding output stored in the cache 145. For example user input "turn off my lamp", the signal hashing model 130 may receive context data 122 (representing past user inputs, discourse history, etc.) "stop, turn off my lamp, turn on my lamp, turn off my light, turn off my lam" and may generate example key 132 "lam light on" and the corresponding value stored in the cache 145 may be "turn off my light". In some examples, the cache 145 may store key that is a combination of the key 132 and the user input data 127 (e.g., the key may be "turn off my lamp+lam light on." For another example user input "turn the living room lamp", the signal hashing model 130 may receive context data 122 "turn on the living room light, turn the living room lam" and may generate key 132 "lam light on"; the cache 145 may store key "turn the living room lamp+lam light on" and corresponding output value "turn on the living room lamp."

In some embodiments, the input provided to the signal hashing model 130 may be pre-processed. In example embodiments, the input may be processed using a rule-based engine that may "clean noise" from the input. For example, for an input (e.g., context data 122 and user input data 127) including utterances in discourse history+current request, the rule-based engine may remove unrelated previous utterances by looking at words-overlap so that the potential noise may be eliminated. As another example, words that are in the current request may be removed from the previous utterances. As yet another example, the words may be sorted (e.g., based on frequency, alphabetically, etc.). The processed input may be provided to the signal hashing model 130, output of which may be used as a key for the cache 145.

In other example embodiments, the input may be pre-processed to extract keywords and the keywords may be provided to the signal hashing model 130 to generate a key. In yet other example embodiments, the input may be pre-processed to generate a summary (e.g., a cluster of related sentences with a short sentence) or perform multi-sentence compression (e.g., using a sentence/word graph based on the shortest paths in the graphs), and the summary or compressed input may be provided to the signal hashing model 130 to generate a key. In yet other embodiments, the input may be pre-processed using semantic compression, where semantically similar words may be combined/removed, and the compressed input may be provided to the signal hashing model 130 to generate a key.

In yet other embodiments, the input may be pre-processed using word-sense tagging. In linguistics, a word sense is one of the meanings of a word. For instance, the first senses of "eye", "optic" and "oculus" all refer to a common definition "the organ of sight". On another hand, the same word in a different sentence may have different sense. This approach can compress the dialog context by combining different words with the same sense, or even with synonyms sense. The "compressed" input may be provided to the signal hashing model 130 to generate a key.

The signal hashing model 130 may generate a key 132 corresponding to the context data 122. The cache lookup component 140 may perform a lookup in the cache 145 for data associated with the key 132. For example, the cache lookup component 140 may send, to the cache 145, a request for data associated with the key 132 and the cache 145 may send (in response to the request) data stored in the cache associated with the key 132.

The cache 145 may store data associated with unique keys, where the data represents an LLM output. The cache 145 may store a final LLM output 146 associated with a key that is generated using context data that is processed by the LLM 150 to determine the final LLM output 146. The cache 145 may also store a partial LLM output 148 associated with a key that is generated using context data that is processed by the LLM 150 to determine the partial LLM output 148.

The shard index 149 may include one or more shard keys for the cache. A shard key may be a table column or multiple columns used to control how the rows of that table are distributed. In some embodiments, the shard key may be generated based on a user profile identifier for the user 105. In other embodiments, the shard key may be generated using other additional information that may be included in the context data 122. Data stored in the cache 145 may be associated with a shard key based on the information used to generate the shard key. For example, a user input from a user A and corresponding to context data B may be associated with a shard key generated using an identifier for user A and the context data B.

The cache 145 may be distributed into multiple shards to handle increased traffic load and cache storage size. The system 100 may use a shard key generation technique by leveraging the cache key 132 with user id information. In example embodiments, the shard key can be determined by hash concatenated string of user id and cache key 132 and mod by the cache shard size. For example, if the user id is "CID" and the cache key 132 is "b", the concatenated string could be "CID ##b", and if the shard size is 100, after applying the hash function and mod by 100 the result could be 89. Then the system 100 may be configured to fetch the cache output from the shard key 89.

The cache lookup component 140 may receive results from the cache 145 for the key 132. In some cases, there may be a cache miss, that is the cache 145 does not include the key 132. In other cases, there may be a cache hit, that is the cache 145 includes the key 132, in which case, the data (e.g., the final LLM output 146 or the partial LLM output 148) associated with the key 132 is returned to the cache lookup component 140. The cache lookup component 140 may communicate the results of the lookup to the controller 135.

The controller 135 may be configured to perform an action based on the results of the cache lookup. For example, if the cache lookup results in receiving the final LLM output 146, then the controller 135 may send the final LLM output 146 to another component(s) for further processing, causing generation of output data responsive to the user input. As another example, if the cache lookup results in receiving the partial LLM output 148, then the controller 135 may send the partial LLM output 148 to the LLM 150 for processing. As yet another example, if the cache lookup results in a cache miss, then the controller 135 may send data (e.g., an instruction, a signal) to the LLM 150 to cause processing of the user input data 127 and the context data 122 by the LLM 150.

In some cases, the controller 135 may send LLM output 152 to another component(s) for further processing, causing generation of output data corresponding to the user input, where the LLM output 152 may be an output generated by the LLM 150 based on processing the user input data 127 and the context data 122 or based on processing the partial LLM output 148, the user input data 127 and the context data 122.

In some embodiments, the system 100 may consider timeouts when processing. A timeout may be a period of time within which processing is be performed/completed. In some embodiments, the timeout may begin when the system receives the user input. For example, the system may receive the user input at t=0 and processing may have to be completed within t=n milliseconds (e.g., 80 milliseconds; 100 milliseconds, etc.) after receipt of the user input. In other embodiments, the timeout may begin when the LLM 150 begins processing. For example, the LLM 150 may begin processing at t=0 and processing may have to be completed within t=n milliseconds (e.g., 80 milliseconds; 100 milliseconds, etc.). The controller 135 may include a timeout tracker 155 that may track whether processing is completed within a defined timeout. In cases where processing is not completed within a timeout, the controller 135 may send a timeout indicator 154 to another component(s) for further processing.

In some embodiments, the timeout tracker 155 may be configured to check for two timeouts. A first timeout may correspond to a period of time within which the LLM 150 is to generate the LLM output 152 corresponding to the user input data 127. If the LLM 150 fails to generate an output before the first timeout occurs (period of time expires), then the controller 135 may output the timeout indicator 154. If the LLM 150 generates the LLM output 152 before the first timeout occurs, then the controller 135 may send the LLM output 152 for further processing.

A second timeout may correspond to a period of time within which the LLM 150 may continue to process the user input data 127 and the context data 122 (and the partial LLM output 148 if available). The second timeout (e.g., 150 milliseconds) may be a longer period of time than the first timeout (e.g., 80 milliseconds). If the LLM 150 generates an output before the second timeout occurs, then the generated output may be stored (by the controller 135) in the cache 145 associated with the key 132. If the LLM 150 fails to generate an output before the second timeout occurs, then the partial output is determined from the LLM 150 and stored in the cache 145 associated with the key 132.

The controller 135 may also perform an action based on a cache refresh indicator 162. The cache prediction component 160 may be configured to determine whether a cache refresh is to be performed where an output (final or partial) generated by the LLM 150 is to be stored in the cache 145. The cache prediction component 160 may consider various factors in making the determination, for example, the cache size, available cache memory, previous hit rate, frequency of the user input (how many times over a period of time the system received the user input or a similar user input), an LLM inference time (a predicted or estimated amount of time it will take the LLM 150 to process the user input), etc. The cache prediction component 160 may include a machine learning model. The cache prediction component 160 may include a tree-based model, a linear regression model, or other type model configured to perform a classification (e.g., a binary classification). The cache prediction component 160 may receive cache metadata 168 from the cache 145, which may include current information regarding the cache 145, for example, cache size, available cache memory, etc. The cache prediction component 160 may receive data from a historic user input data storage 165 representing past user inputs received by the system 100. In some embodiments, the historic user input data storage 165 may store frequent user input data. The frequent user input data may indicate user inputs that are received by the system 100 on a frequent basis (e.g., a threshold number of times over a period of time; a number of times over the past 30 days, a number of times over the past 90 days, etc.). In other embodiments, the historic user input data storage 165 may indicate all different user inputs received by the system 100, where an individual user input is associated with a number indicating how many times it was received by the system 100 during a period of time (a frequency of receiving the user input). For example, the user input "What is today's weather?" may be associated with a first number indicating how many times it was received by the system 100. In some cases, the user inputs may be grouped into one user input based on semantically similarity. For example, the user input "What is today's weather", "How is the weather today", "Tell me today's weather", etc. may be grouped as one user input.

The cache prediction component 160 may receive data from a historic cache usage storage 166 that may store information representing past usage of the cache 145. For example, the historic cache usage storage 166 may indicate a cache hit rate or a cache miss rate for all lookups, a cache hit rate or miss rate for particular outputs/data stored in the cache, etc.

The cache prediction component 160 may process the user input data 127 and the context data 122 to determine the cache refresh indicator 162 representing whether or not an output generated by the LLM 150 is to be stored in the cache 145. The cache refresh indicator 162 may be a Boolean value (e.g., yes or no; true or false; 0 or 1; etc.) or another type of data. Based on the cache refresh indicator 162 being affirmative, the controller 135 may cause an output generated by the LLM 150 to be stored in the cache 145, where the output is associated with the key 132 (corresponding to the context data 122).

Figure 2:
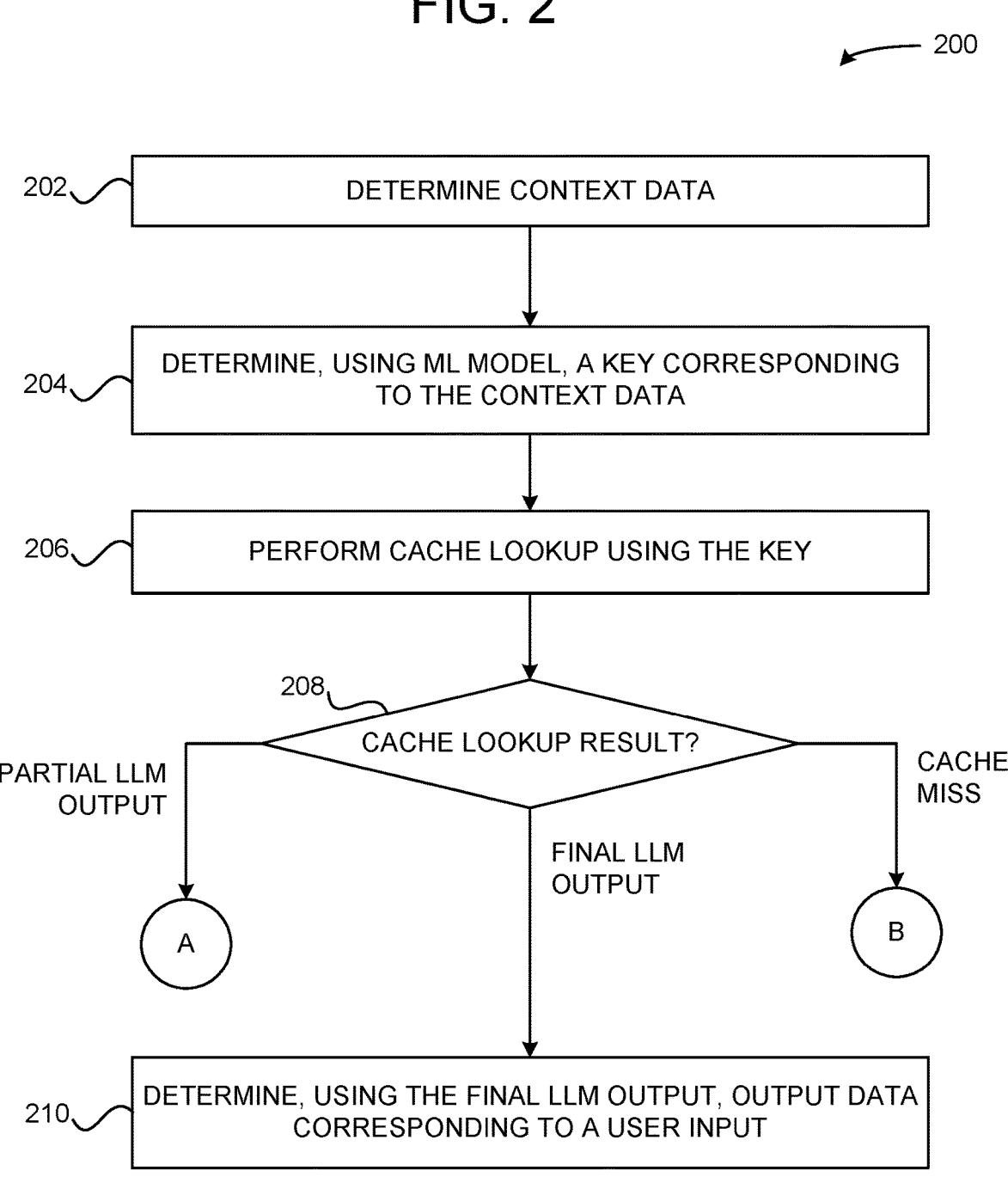
FIG. 2 is a flowchart illustrating an example process that may be performed by the system to determine whether an output corresponding to context data is available in a cache, according to embodiments of the present disclosure.

FIG. 2 is a flowchart illustrating an example process 200 that may be performed by the system to determine whether an output corresponding to context data is available in a cache, according to embodiments of the present disclosure. At a step 202 of the process 200, the system 100 may determine the context data 122 (described above in relation to FIG. 1). At a step 204, the system 100 may determine, using a machine learning (ML) model (e.g., the signal hashing model 130), the key 132 corresponding to the context data 122. At a step 206, the cache lookup component 140 may perform a cache lookup in the cache 145 using the key 132. At a decision step 208, the controller 135 may consider the result of the cache lookup. If a final LLM output (e.g., the final LLM output 146) is received from the cache 145, then at a step 210, the system 100 may determine, using the final LLM output 146, output data corresponding to the user input represented in the user input data 127. In this manner, the system may use a stored LLM output corresponding to the context data 122 (corresponding to the key 132) to respond to the user input data 127, rather than processing the user input data 127 and the context data 122 using the LLM 150. This can result in latency reduction and computational resource savings.

If, at the decision step 208 of the process 200, the cache lookup result is a partial LLM output, then the system 100 may perform a process 300 of FIG. 3 described below in detail. The cache 145 may store a partial LLM output if processing by the LLM 150 is not completed by a timeout (e.g., the second timeout described above). If, at the decision step 208, the cache lookup result is a cache miss (i.e., the key 132 is not in the cache 145), then the system 100 may perform a process 400 of FIG. 4 described below in detail.

Figure 3:
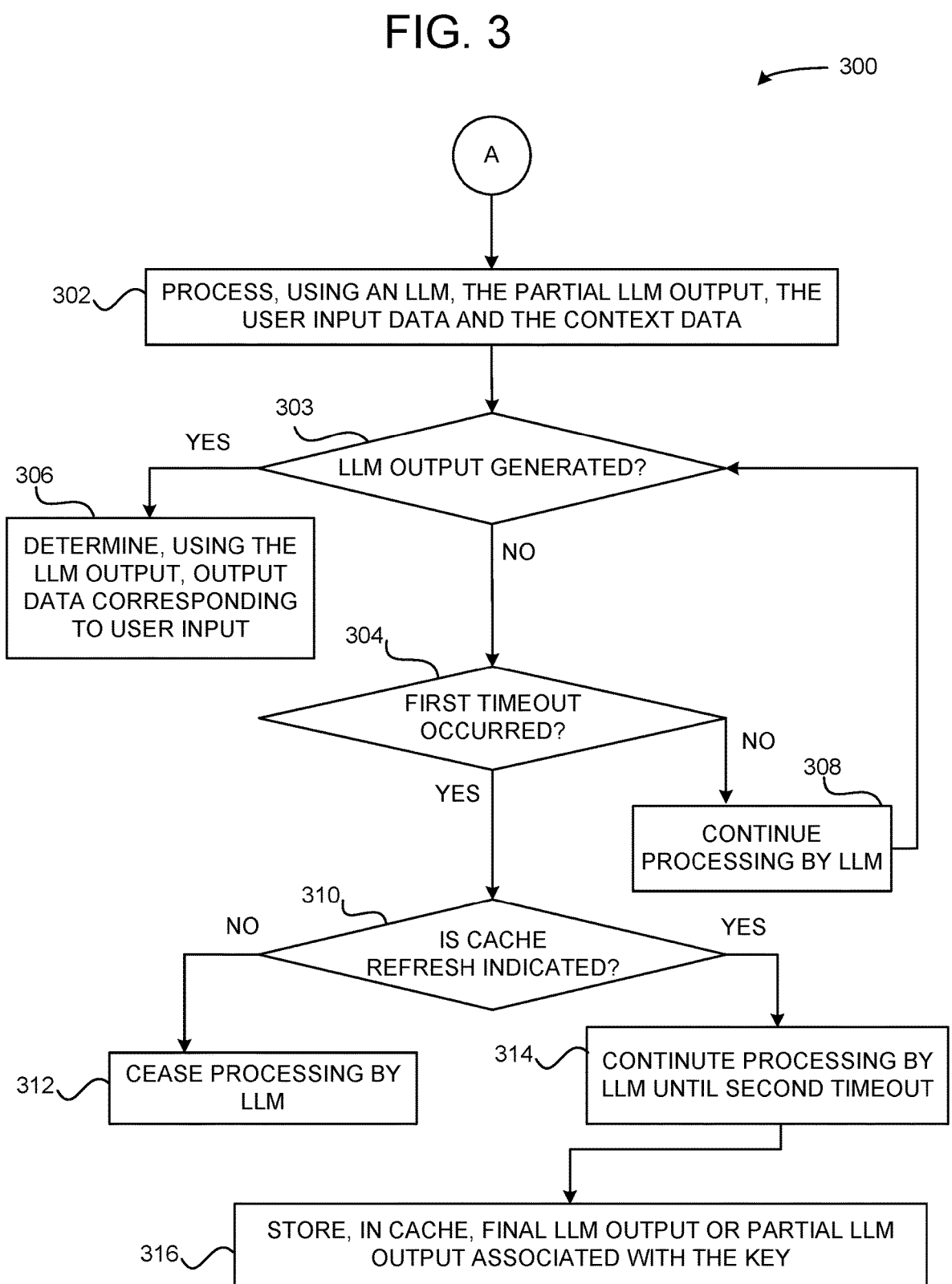
FIG. 3 is a flowchart illustrating an example process that may be performed by the system based on a partial output available in the cache, according to embodiments of the present disclosure.

FIG. 3 is a flowchart illustrating an example process 300 that may be performed by the system based on a partial output available in the cache, according to embodiments of the present disclosure. At a step 302 of the process 300, the system 100 may process, using the LLM 150, the partial LLM output 148, the user input data 127 and the context data 122. The partial LLM output 148 may include model data, such as embedding data for one or more layers of the LLM 150, parameter values for one or more layers of the LLM 150, etc. The partial LLM output 148 may represent model data (e.g., based on the state of the model) of the LLM 150 when processing is ceased (e.g., at the second timeout). As such, the partial LLM output 148 may not be a final response that is likely a natural language response/output from the LLM. For the step 302, layers of the LLM 150 may be first initialized using the partial LLM output 148, then the initialized LLM may process the user input data 127 and the context data 122. Based on processing the foregoing data, the LLM 150 may attempt to generate an output corresponding to the user input data 127. In some embodiments, the LLM 150 is generate an output within a timeout.

At a decision step 303, the controller 135 may determine whether an LLM output is generated (based on the processing by the LLM 150 at the step 302). If an output (e.g., the LLM output 152) has been generated by the LLM 150, then at a step 306, the system 100 may determine, using the LLM output 152, output data corresponding to the user input represented in the user input data 127. In this manner, the system may use an output by the LLM 150 if generated before a first timeout occurs.

If at the decision step 303, an LLM output is not yet generated, then at a decision step 304, the controller 135, via the timeout tracker 155, may determine whether a first timeout is occurred. If the first timeout has not yet occurred, then at a step 308, the controller 135 may continue processing of the partial LLM output 148, the user input data 127 and the context data 122 by the LLM 150. After continuing processing by the LLM 150, the process 300 may perform the decision step 303 again to determine whether an LLM output is generated.

If, at the decision step 304, the first timeout has occurred (and an output is not generated by the LLM 150), then the system 100 may perform step 310. At the decision step 310, the controller 135 may determine whether a cache refresh is indicated (e.g., in the cache refresh indicator 162). If the cache refresh indicator 162 is negatory, that is, an LLM output corresponding to the user input data 127 and the context data 122 is not to be stored in the cache 145, then at a step 312 the controller 135 may cease processing by the LLM 150. For example, if the user input is not a frequently received user input, then the cache prediction component 160 may determine that a corresponding LLM output is not to be stored. As another example, if an inference/processing time for the user input is small/below a threshold value, then the cache prediction component 160 may determine that a corresponding LLM output is not to be stored. In this manner, the system may cache outputs for user inputs that satisfy certain conditions.

If, at the decision step 310, the cache refresh indicator 162 is affirmative, then at a step 314 the controller 135 may continue processing by the LLM 150 until a second timeout. The second timeout may be longer than the first timeout (of the decision step 304). After the second timeout occurs, at a step 316, the controller 135 may store, in the cache 145, a final LLM output (e.g., the final LLM output 146) or a partial LLM output (e.g., the partial LLM output 148) associated with the key 132. For example, for a frequently received user input, the cache prediction component 160 may determine that a corresponding LLM output is to be stored, and the system 100 may allow the LLM 150 to continue processing until the second timeout to obtain some output (either final or partial) for storage in the cache 145. As yet another example, if an inference/processing time for the user input is large/above a threshold value, then cache prediction component 160 may determine that a corresponding LLM output is to be stored. If the LLM output is available before the second timeout, then the (final) LLM output is stored in the cache 145 at that time.

Figure 4:
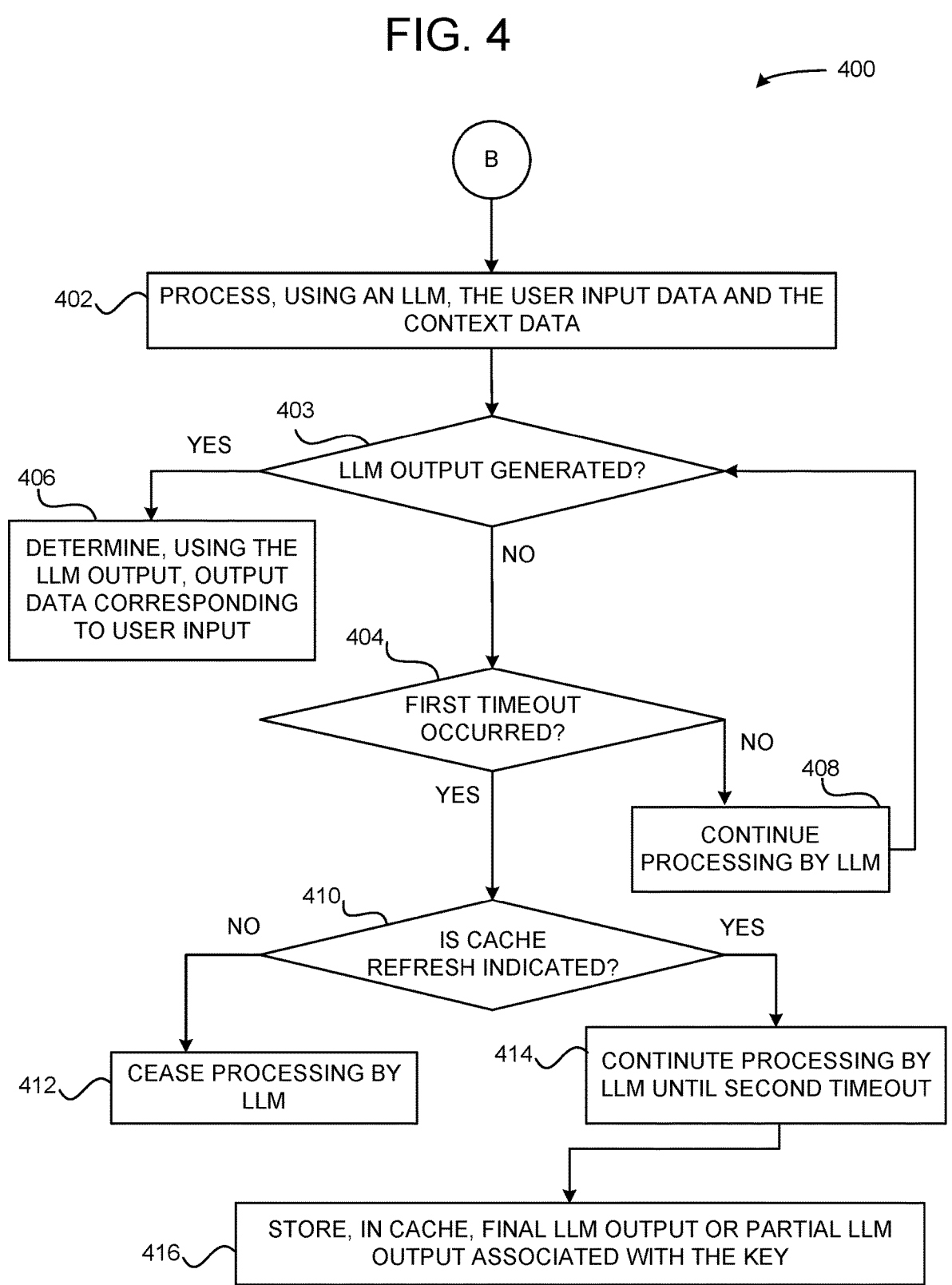
FIG. 4 is a flowchart illustrating an example process that may be performed by the system based on a cache miss, according to embodiments of the present disclosure.

FIG. 4 is a flowchart illustrating an example process 400 that may be performed by the system based on a cache miss, according to embodiments of the present disclosure. At a step 402 of the process 400, the system 100 may process, using the LLM 150, the user input data 127 and the context data 122. Based on processing the foregoing data, the LLM

150 may attempt to generate an output corresponding to the user input data 127. In some embodiments, the LLM 150 is to generate an output within a timeout.

At a decision step 403, the controller 135 may determine whether an LLM output is generated (based on the processing by the LLM 150 at the step 402). If an output (e.g., the LLM output 152) has been generated by the LLM 150, then at a step 406, the system 100 may determine, using the LLM output 152, output data corresponding to the user input represented in the user input data 127. In this manner, the system may use an output by the LLM 150 if generated before a first timeout occurs.

If at the decision step 303, an LLM output is not yet generated, then at a decision step 404, in a similar manner to the decision step 304 of the process 300, the controller 135, via the timeout tracker 155, may determine whether a first timeout is occurred. If the first timeout has not yet occurred, then at a step 408, the controller 135 may continue processing of the user input data 127 and the context data 122 by the LLM 150. After continuing processing by the LLM 150, the process 400 may perform the decision step 403 again to determine whether an LLM output is generated. If, at the decision step 404, the first timeout has occurred (and an output is not generated by the LLM 150), then the system 100 may perform step 410. At the decision step 410, similar manner to the decision step 310 of the process 300, the controller 135 may determine whether a cache refresh is indicated. If the cache refresh indicator 162 is negatory, then at a step 412 the controller 135 may cease processing by the LLM 150. The system may cache outputs for user inputs that satisfy certain conditions.

If, at the decision step 410, the cache refresh indicator 162 is affirmative, then at a step 414 the controller 135 may continue processing by the LLM 150 until a second timeout that may be longer than the first timeout. After the second timeout occurs, at a step 416, the controller 135 may store, in the cache 145, a final LLM output (e.g., the final LLM output 146) or a partial LLM output (e.g., the partial LLM output 148) associated with the key 132. If the LLM output is available before the second timeout, then the (final) LLM output is stored in the cache 145 at that time.

As used herein, a final LLM output refers to an output generated by the LLM 150 based on completing processing of inputted data, where the final LLM output may be a natural language output. The final LLM output may be usable by other components (e.g., system components 120) for further processing. As used herein, a partial LLM output refers to an output derived from the LLM 150 based on partial/incomplete processing of inputted data. The partial LLM output may be model data representing embeddings, parameter values, weights, etc. that may be determined by the LLM 150 based on processing the inputted data. The partial LLM output may be provided to the LLM 150 to enable the LLM 150 to continue processing from the prior stopping point rather than initiating processing from a beginning point. Using the partial LLM output can reduce latency and save computational resources.

Figure 5:
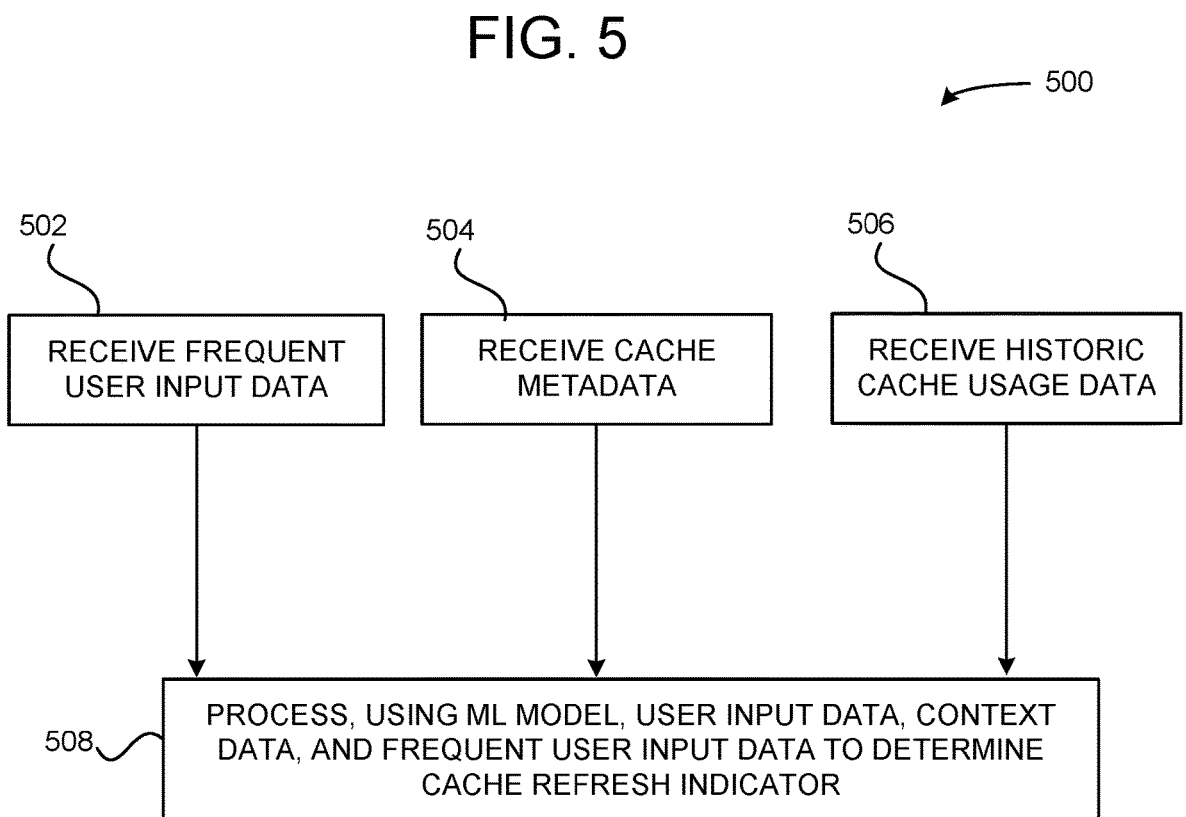
FIG. 5 is a flowchart illustrating an example process that may be performed by the system to determine whether a cache refresh is to be performed, according to embodiments of the present disclosure.

FIG. 5 is a flowchart illustrating an example process 500 that may be performed by the system to determine whether a cache refresh is to be performed, according to embodiments of the present disclosure. At a step 502 of the process 500, the cache prediction component 160 may receive frequent user input data (e.g., from the historic user input data storage 165). The frequent user input data may indicate user inputs that are received by the system 100 on a frequent basis (e.g., a threshold number of times over a period of time; a number of times over the past 30 days, a number of times over the past 90 days, etc.). In other embodiments, the frequent user input data may indicate all different user inputs received by the system 100, where an individual user input is associated with a number indicating how many times it was received by the system 100 during a period of time. For example, the user input "What is today's weather?" may be associated with a first number indicating how many times it was received by the system 100. In some cases, the user inputs may be grouped into one user input based on seman-tically similarity. For example, the user input "What is today's weather", "How is the weather today", "Tell me today's weather", etc. may be grouped as one user input.

At a step 504, the cache prediction component 160 may receive cache metadata 168. The cache metadata 168 may represent current information regarding the cache 145, for example, cache size, available cache memory, etc. At a step 506, the cache prediction component 160 may receive historic cache usage data (e.g., from the historic cache usage storage 166). The historic cache usage data may represent past usage of the cache 145. For example, the historic cache usage storage 166 may indicate a cache hit rate or a cache miss rate for all lookups, a cache hit rate or miss rate for particular outputs/data stored in the cache, etc.

At a step 508, the cache prediction component 160 may process, using a ML model, the user input data 127, the context data 122 and the frequent user input data to deter-mine the cache refresh indicator 162. The cache prediction component 160/the ML model may be configured to con-sider a cache size of the cache 145 and the value/benefit of storing an output corresponding to the context data 122. The cache prediction component 160 may consider the following in determining the cache refresh indicator 162: how fre-quently the user input represented in the user input data 127 is received by the system 100; an amount of time (predicted or estimated) it takes the LLM 150 to process the user input; cache size/available cache memory; historic cache hit rate (how many times historically has a cache lookup resulted in an output corresponding to the context data 122/the key 132); and others. The goal is to have a cache size that is quickly and efficiently searchable, thus, caching every out-put is not beneficial. For example, an output that does not takes a large amount of time for the LLM 150 to generate, may not be cached; instead whenever the corresponding user input is received, the system may run the LLM 150 to determine the output for each instance. Whereas, an output that does take a large amount of time for the LLM 150 to generate, may be cached, so that whenever the correspond-ing user input is received, the output can be retrieved from the cache rather than running the LLM 150.

Thus described herein are techniques for efficient cache management for LLM processing. Here is an example a scenario for use of the techniques. Consider a user 105 associated with a user identifier [user id] submits a query for classical music, and the system is configured for a first timeout of 80 ms and a second timeout of 160 ms. The context data for this user interaction may include device location, device type, device status, previous interactions with the system, and a playlist. The context data may be provided to the signal hashing model 130 to generate a compressed cache key and a shard key. These keys can ensure a one-to-one mapping between the input (context data) and LLM outputs and are used to look up both final and partial inference results (e.g., intermediate checkpoint layer output) from the LLM 150. In the event of a cache miss for the final result, the system may return the partial result for the prior LLM inference. The cache prediction component 160 may predict that this user request is a frequent request, which will benefit from a cache refresh. When the system reaches the 80 ms timeout but LLM inference has not been completed, it will continue the inference thread until the second timeout of 160 ms. If the final result is generated within this timeframe, it will be stored in the cache 145, whereas the partial result will be stored if the final result cannot be generated within the allotted time. Consequently, even if the LLM cannot serve/respond to the user request in this instance, another (future similar) user request will possibly hit the cache or enable completion of the partial inference within the second timeout.

Rather than employing raw input or simple ID combina-tions as cache keys, the system of the present disclosure utilizes the signal hashing model 130 to compress key variations while simultaneously maintaining a low collision rate. This approach can provide a means of addressing challenges associated with key explosion and high cache refresh rates when involving context signals. Additionally, the system of the present disclosure supports sharding based on user id to store the cache in a scalable way, in which certain users (e.g., that interact with the system frequently) could be allocated more cache resources, and other users (e.g., ones that interact less frequently with the system or new users) could be allocated in the shards with enough space. Moreover, the system supports storing of both partial and final results generated by the model to reduce inference latency and computation cost. Additionally, considering a balance between hit rate and computation cost, the cache prediction component 160 can evaluate the cache status and predict the benefit of refreshing specific user requests and context, where this prediction may ensure that the cached results remain relevant and useful for the future.

The LLM 150, shown in FIG. 1, may be an LLM that is used to perform a particular task/function that are described below in detail with respect to FIGS. 6-9. The cache management techniques described in relation to FIG. 1 may be used in a similar manner with respect to the LLMs described in relation to FIGS. 6-9. For example, the system may include a cache to store outputs generated by a plan generation language model 720 (shown in FIG. 7), where the keys for the cache may be generated using prompt data 715, and the cache may store LLM outputs that can be used to respond to similar/same prompt data 715, rather than the plan generation language model 720 re-processing the prompt data 715. As another example, the system may include a cache to store outputs generated by a task selection language model 740 (shown in FIG. 7), where the keys for the cache may be generated using prompt data 735, and the cache may store LLM outputs that can be used to respond to similar/same prompt data 735, rather than the task selection language model 740 re-processing the prompt data 735. As another example, the system may include a cache to store outputs generated by a shortlister language model 840 (shown in FIG. 8), where the keys for the cache may be generated using prompt data 815, and the cache may store LLM outputs that can be used to respond to similar/same prompt data 815, rather than the shortlister language model 840 re-processing the prompt data 815. As yet another example, the system may include a cache to store outputs generated by a response language model 920 (shown in FIG. 9), where the keys for the cache may be generated using prompt data 915, and the cache may store LLM outputs that can be used to respond to similar/same prompt data 915, rather than the response language model 920 re-processing the prompt data 915.

In some embodiments, the cache management techniques described in relation to FIG. 1 may be used in a similar manner with respect to the other system components including but not limited to ML models described in relation to FIGS. 6-12. For example, the system may include a cache to store outputs generated by a plan prompt generation component 710 (shown in FIG. 7), where the keys for the cache may be generated using the user input data 127 and/or context data 705, and the cache may store outputs that can be used to respond to similar/same user input data 127 and/or context data 705. As another example, the system may include a cache to store outputs generated by a task selection prompt generation component 730 (shown in FIG. 7), where the keys for the cache may be generated using the user input data 127, personalized context data 667, context data 705 and/or model output data 725, and the cache may store outputs that can be used to respond to similar/same user input data 127, personalized context data 667, context data 705 and/or model output data 725 and/or context data 705. As yet another example, the system may include a cache to store outputs generated by a shortlister prompt generation component 810 (shown in FIG. 8), where the keys for the cache may be generated using relevant API data 835 and/or task processing data 637, and the cache may store outputs that can be used to respond to similar/same using relevant API data 835 and/or task processing data 637. As yet another example, the system may include a cache to store outputs generated by a response prompt generation component 910 (shown in FIG. 9), where the keys for the cache may be generated using context data 942, model output data 643 and personalized context data 667, and the cache may store outputs that can be used to respond to similar/same using context data 942, model output data 643 and personalized context data 667.

Figure 6:
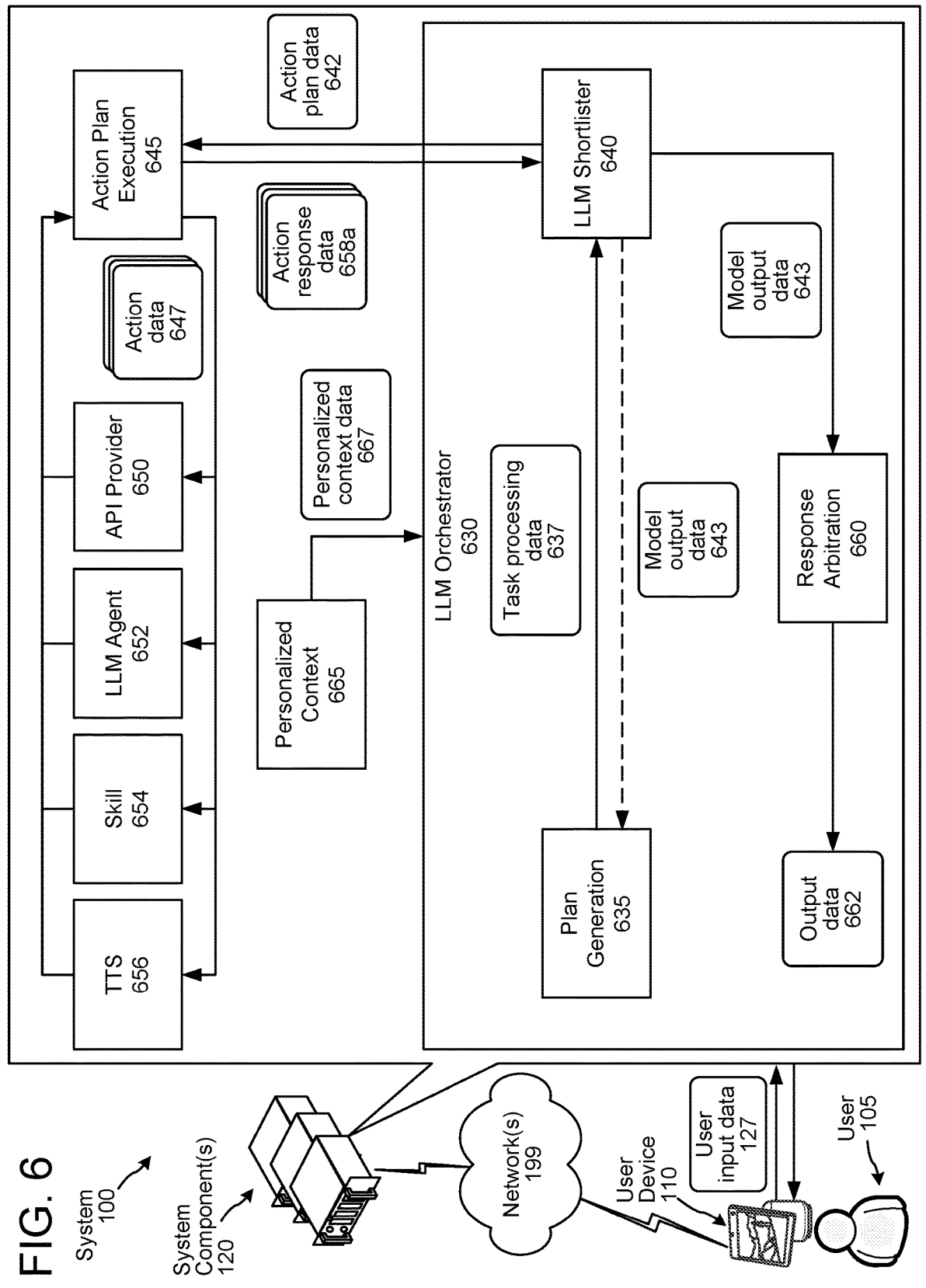
FIG. 6 is a conceptual diagram illustrating example components and processing for determining one or more components configured to perform an action associated with the task, according to embodiments of the present disclosure.

In some embodiments, a key for the cache 145 may be generated using data other than text data or natural language data, for example, using audio data, image data, video data, etc. FIG. 6 illustrates a system 100 for using one or more language models to determine an action responsive to a user input. As shown in FIG. 6, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a large language model (LLM) orchestrator component 630, a personalized context component 665, an action plan execution component 645, an API provider component 650, an LLM agent component 652, a skill component 654, and a TTS component 656. The LLM orchestrator component 630 may include a plan generation component 635, an LLM shortlister component 640, and a response arbitration component 660. In some embodiments, the response arbitration component 660 may exist elsewhere in the system component(s) 120 outside of the LLM orchestrator component 630.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input text using a bidirectional encoding, and the decoder may use that representation to perform some task. In some such embodiments, one or more of the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model [ref #] may be pre-trained for approximately 1 trillion tokens. Being trained on CLM tasks, the one or more language models may be capable of in-context learning. An example of such a LLM is Alexa Teacher Model (Alexa™).

In other embodiments, where one or more of the language models are an LLM, the one or more language models may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs, and may output text and/or other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, for an example prompt "how do I cook rice?", the LLM may output a recipe (e.g., a step-by-step process) to cook rice. As another example, for an example prompt "I am hungry. What restaurants in the area are open?", the LLM may output a list of restaurants near the user that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 630 may generate prompt data representing a prompt for input to the language models. As shown in FIG. 6, the system component(s) 120 receive user input data 127, which may be provided to the LLM orchestrator component 630. In some instances, the user input data 127 may correspond to a text or tokenized representation of a user input. For example, the user input data may include input text (or tokenized) data when the user input is a typed natural language user input. For further example, prior to the LLM orchestrator component 630 receiving the user input data 127, another component (e.g., an automatic speech recognition (ASR) component 1050) of the system 100 may receive audio data representing the user input. The ASR component 1050 may perform ASR processing on the audio data to determine ASR data corresponding to the user input, which may correspond to a transcript of the user input. As described below, with respect to FIG. 10, the ASR component 1050 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1050 level of confidence that the corresponding hypothesis represents what the user said. The ASR component 1050 may also determine token scores corresponding to each token/word of the ASR hypothesis, where the token score indicates the ASR component's 1050 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the LLM orchestrator component 630 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 110 (e.g., a smartphone, a smart speaker, etc.) to present an alert to the user. The LLM orchestrator 630 may process the input data to generate tasks that may cause the foregoing example actions to be performed.

The user input data 127 may be received at the LLM orchestrator component 630 of the system component(s) 120, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 7. In instances where the plan generation component 635 generates more than one task to be completed in order to perform the action responsive to the user input, the plan generation component 635 may further maintain and prioritize the list of tasks as the processing of the system 100 with respect to the user input is performed. In other words, as the system 100 processes to complete the list of tasks, the plan generation component 635 may (1) incorporate the results of the processing performed to complete the tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 635 may generate and send task processing data 637 representing the selected task to be completed and various other information needed to perform further processing with respect to the task (e.g., the user input data 127, an indication of the selected task, results of processing performed for previous tasks, the remaining task(s), and context data associated with the user input data 127, as described in detail herein below with respect to FIG. 7) to the LLM shortlister component 640.

The LLM shortlister component 640 may be configured to determine one or more components (e.g., APIs, skill component(s) 654, LLM agent component(s) 652, TTS component 656, etc.) configured to perform an action related to the user input or the current task. The LLM shortlister component 640 may further be configured to generate and cause the execution of a request(s) (e.g., an API call(s)) for the one or more components to provide an output(s) such as a description(s) representing the action the components are configured to/will perform with respect to the user input or the current task., Such requests may be represented in the action plan data 642 sent to the action plan execution component 645. The action plan execution component 645 may identify the request(s) in the action plan data 642 and cause the corresponding components (e.g., the API provider component 650, the LLM agent component 652, the skill component 654, and/or the TTS component 656) to generate action response data 658a-n representing the requested output(s). where individual action response data 658a may be provided by/correspond to a particular responding component—one of the API provider component 650, the LLM agent component 652, the skill component 654, and/or the TTS component 656. In some embodiments, the action response data 658 may include an identifier (e.g., a component name, an alphanumerical value associated with the component, etc.) for the component providing the data. The LLM shortlister component 640 receives and processes the action response data 658a-n and generates model output data 643 representing the output(s) (e.g., relevant outputs, selected outputs, ranked outputs, etc.) for further processing (e.g., as described in detail herein below with respect to FIG. 8). If the LLM shortlister component 640 determines that there are no remaining tasks to be completed, the LLM shortlister component 640 may send the model output data 643 to the response arbitration component 660.

The response arbitration component 660 processes the model output data 643 to determine whether completion of the one or more tasks by the system 100 results in performance of the action responsive to the user input. In other words, the response arbitration component 660 processes the model output data 643 (representing the actions to be performed in response to the user input) and (1) selects one or more of the actions to be output to the user; (2) generates a natural language summary of one or more of the actions; and/or (3) determines that none of the actions are responsive to the user input. For example, the response arbitration component 660 may process the model output data 643 to determine if one or more of the actions performable by the API(s) (e.g., represented by the natural language descriptions) are responsive to the current task. If the response arbitration component 660 determines that none of the actions are responsive to the user input, then the response arbitration component 660 may send an instruction to the personalized context component 665 to generate clarifying information (e.g., personalized context data 667) for the user input. Additionally, or alternatively, the response arbitration component 660 may generate a natural language question to be output to the user requesting the clarifying information. In such instances, the system 100 (e.g., the plan generation component 635, the LLM shortlister component 640, and/or the response arbitration component 660) may process as described herein with further respect to the clarifying information (e.g., the personalized context data 667 and/or the user-provided clarifying information) to perform the action responsive to the user input.

Figure 7:
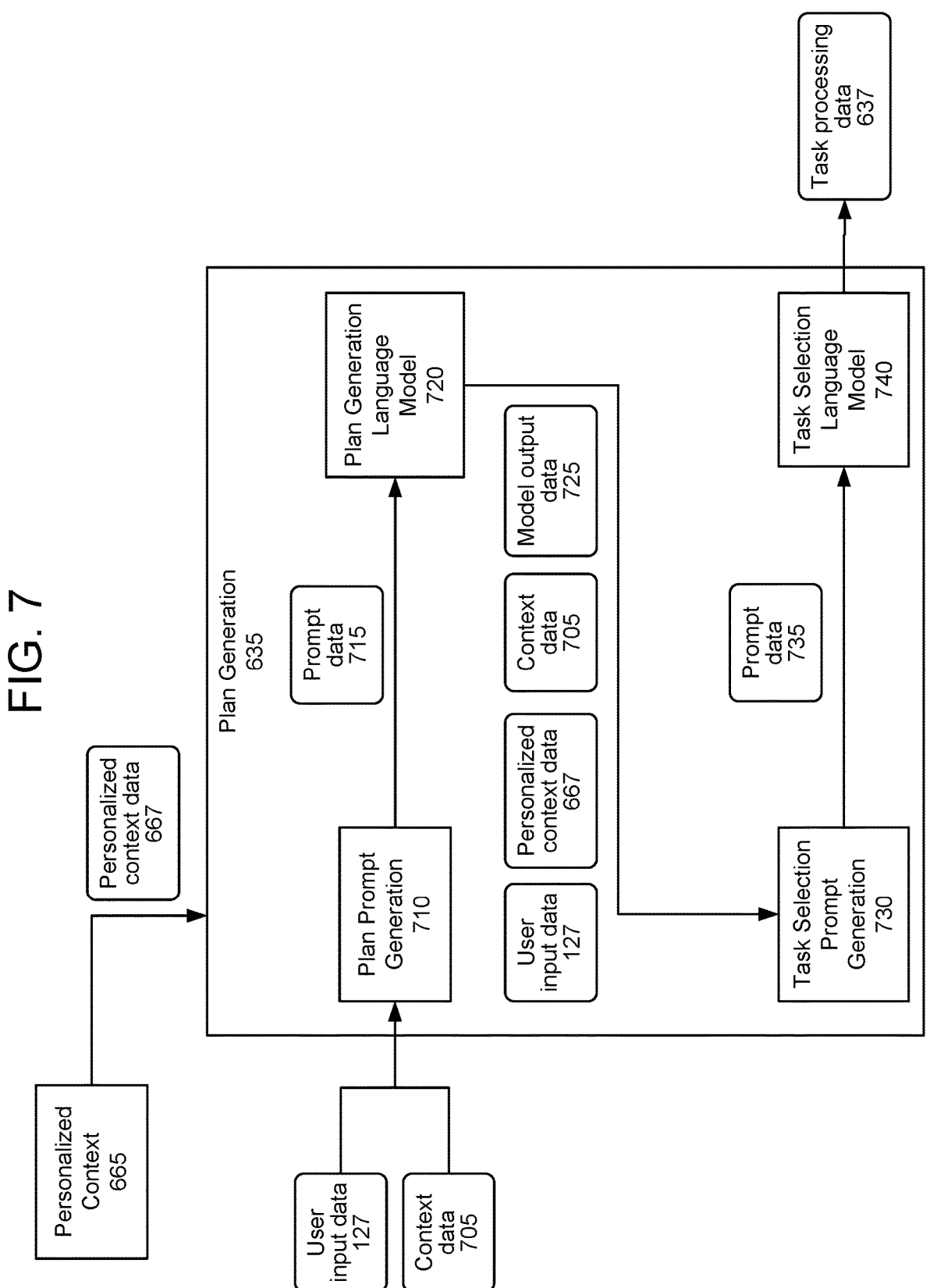
FIG. 7 is a conceptual diagram illustrating example components and processing of a plan generation component, according to embodiments of the present disclosure.

FIG. 7 illustrates example processing of the plan generation component 635. As shown in FIG. 7, the plan generation component 635 may include a plan prompt generation component 710, a plan generation language model 720, a task selection prompt generation component 730, and a task selection language model 740.

As further shown in FIG. 7, the user input data 127 is received at the plan prompt generation component 710. The plan prompt generation component 710 processes the user input data 127 to generate prompt data 715 representing a prompt for input to the plan generation language model 720. In some embodiments, the plan prompt generation component 710 may further receive an indication of one or more remaining tasks to be completed with respect to the user input data 127. For example, if the current iteration of processing with respect to the user input data 127 is a subsequent iteration of processing (e.g., the system previously determined that more than one task is to be completed in order to perform an action responsive to the user input data 127 and has previously performed at least a first task of the more than one tasks), then the plan prompt generation component 710 may further receive an indication of the remaining tasks to be completed. In such embodiments, the plan prompt generation component 710 may further receive an indication of the completed task(s) and/or result(s) of the processing performed to complete the task(s). The plan prompt generation component 710 may further receive context data 705 representing various contextual signals associated with the user input data 127, such as weather information, time of day, device information associated with the device that sent the user input data 127 (e.g., device ID, device states, historical device interaction data, etc.). Such prompt data 715 may be generated based on combining the user input data 127 and the context data 705 (and, in some embodiments, the indication of the remaining task(s), completed task(s), and/or the results of the processing performed to complete the task(s)). In some embodiments, the prompt data 715 may be generated further based on personalized context data 667 representing one or more contextual signals associated with a user that provided the user input, such as information associated with a user profile of the user (e.g., user ID, user behavioral information, user preferences, age, gender, historical user interaction data, devices associated with the user profile, etc.), which may be determined using, for example, a user recognition component 1095. In some embodiments, an indication of the user and/or user profile may be included in the user input data 127 (e.g., as included in the output of the ASR component 1050.). In some embodiments, the personalized context data 667 may include dialog history data representing one or more user inputs and corresponding system-generated responses for a current interaction between the user and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The plan prompt generation component 710 may receive the personalized context data 667 from a personalized context component 665. The personalized context component 665 may be configured to determine and return contextual information associated with a user input to the plan prompt generation component 710, which the plan prompt generation component 710 may combine with the user input data 127 to generate the prompt data 715. In some embodiments, the personalized context component 665 may query various components and/or storages (e.g., the profile storage 1070) for the contextual information. In some embodiments, the personalized context component 665 may include a storage including one or more portions of the contextual information. In other embodiments, the personalized context component 665 may be/implement an LLM. In such embodiments, the personalized context component 665 may be finetuned on personalized information for one or more users, as is discussed in more detail herein below. Further, in such embodiments, the personalized context component 665 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 667) associated with the prompt.

The personalized context component 665 may be caused to generate and return the personalized context data 667 based on the system 100 determining that clarifying information is needed in order to complete a task associated with a user input. For example, one or more of the components of the system 100 (e.g., the plan generation language model 720, the task selection language model 740, the shortlister language model 840, the response arbitration component 660) may determine that an ambiguity exists in the user input (or the data determined/generated as a result of processing with respect to the user input). In such examples, the personalized context component 665 may receive the user input, the current task, and/or model output data indicating that an ambiguity exists/clarifying information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 665 may process as described herein above to generate the personalized context data 667 (e.g., "The user prefers [Music Streaming Service 1].")

In some embodiments, plan prompt generation component 710 (or another component of the system 100) may process the context data 705, the personalized context data 667, the user input data 127, and/or the result of processing performed to complete a task associated with the user input data 127 to generate a natural language representation of the user input (represented by the user input data 127) that is updated to include the contextual information of the personalized context data 667 (e.g., a contextual rewrite of the user input). Thereafter, the plan prompt generation component 710 may process to generate the prompt data 715 using the updated user input data.

In some embodiments, the prompt data 715 may be an instruction for the plan generation language model 720 to determine one or more tasks (e.g., steps/actions) that are to be completed in order to perform an action responsive to the user input given the other information (e.g., the personalized context data 667, the indication of the remaining task(s), the indication of the completed task(s), and/or the corresponding response(s)) included in the prompt data 715.

In some embodiments, the plan prompt generation component 710 may also include in the prompt data 715 a sample processing format to be used by the plan generation language model 720 when processing the prompt. In some embodiments, the plan prompt generation component 710 may generate the prompt data 715 according to a template format. For example, the prompt data 715 may adhere to a template format of:

```
{
Create a new task if necessary to help complete a request
    to [user input data 127 (or a representation of a deter-
    mined intent of the user input data 127].
Here are the completed tasks, their results, user inputs,
    and context so far:
[completed tasks, results of processing performed to com-
    plete the tasks, dialog history, context data 705, per-
    sonalized context data 667]
These are the remaining tasks to be completed:
[remaining task data]
Based on the result, create new tasks to be completed, if
    necessary.
Return the tasks as an array.
}
```

In some embodiments, the template format may instruct the plan generation language model 720 as to how it should process to generate the one or more tasks (e.g., steps) that are to be completed in order to perform the action responsive to the user input. In some embodiments, the format may further include an indication, such as a label of "User:" indicating the following string of characters/tokens as the user input. In some embodiments, the format may further include a label of "Thought:" instructing the plan generation language model 720 to generate an output representing the determined interpretation of the user input by the plan generation language model 720 and/or an action that should be taken (e.g., the user is requesting [intent of the user input], the user is trying to [intent of the user input], need to determine [information needed to properly process the user input] etc.) In some embodiments, the format may further include an indication of "Observation:" indicating the following string of characters/tokens as the result of performance of an action determined by the plan generation language model 720/the plan generation language model 720's interpretation of the result of the performance of the action determined by the plan generation language model 720 (e.g., the completed tasks and/or their results). In some embodiments, the format may further include an indication of "Response:" instructing the plan generation language model 720 to generate a response (e.g., one or more tasks to be completed to perform an action responsive to the user input) to the prompt.

Following such a template format, for example, and for a user input of "turn on all of the lights except the garage," the plan prompt generation component 710 may generate example prompt data 715*a*:

```
{
Create a new task if necessary to help complete a request
    to turn on all of the lights except the garage.
Here are the completed tasks, their results, user inputs,
    and context so far:
[ ]
These are the remaining tasks to be completed:
[ ]
Based on the result, create new tasks to be completed, if
    necessary.
Return the tasks as an array.
}
```

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 710 may process the user input, corresponding context data, the remaining task list, and results of processing performed with respect to previous tasks (e.g., the users pizza preference, determined, for example, by the personalized context component 665) to generate example prompt data 715*a:*

{
Create a new task if necessary to help complete a request to order some pizza for dinner.
Here are the completed tasks, their results, user inputs, and context so far:
Completed tasks:
Identify user pizza preference: user ordered Brooklyn style pizza from [Company name]
These are the remaining tasks to be completed:
Find application to order pizza
Based on the result, create new tasks to be completed, if necessary.
Return the tasks as an array.
}

In some embodiments, the plan prompt generation component 710 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 715 may include "Please generate a polite, respectful, and safe response and one that does not violate protected class policy."

The plan generation language model 720 processes the prompt data 715 to generate model output data 725 representing one or more predicted tasks to be completed in order to perform the action responsive to the user input. For example, based on processing the first example prompt data provided above, the plan generation language model 720 may output model output data: {"turn on all of the lights except the garage light," } or the like. For further example, as discussed above, based on processing prompt data corresponding to the user input "please order some pizza for dinner" the plan generation language model 720 may output model output data: {"identify user pizza preference;" "find application that enables ordering of pizza," or the like. After the first task of "identify user pizza preference" is complete, and based on processing the second example prompt data provided above, the plan generation language model 720 may further output model output data: {"find an application to order pizza" "find API to order [Company name] pizza," } or the like. In some embodiments, the threshold for determining the one or more tasks may be such that the plan generation language model 720 is encouraged to generate multiple predicted tasks for a given user input, where the system 100 may parse and filter the list of tasks during downstream processing (e.g., during the processing of the task selection language model 740). For example, based on processing the first example prompt data provided above, the plan generation language model 720 may output model output data: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor," } or the like.

The model output data 725 is sent to the task selection prompt generation component 730, which processes the model output data 725 to generate prompt data 735 representing a prompt for input to the task selection language model 740. In some embodiments, such prompt data 735 may be generated based on combining the user input data 127, the context data 705, the personalized context data 667, the prompt data 715, and/or the model output data 725. In some embodiments, the plan generation component 635 may include another component that parses the model output data 725 to determine the one or more tasks and may send a representation of the one or more tasks to the task selection prompt generation component 730.

In some embodiments, the prompt data 735 may be an instruction for the task selection language model 740 to select a task of the one or more tasks that is to be completed first (e.g., completed during the current iteration of processing) given the information (e.g., user input data 127, the personalized context data 667, and the one or more tasks) included in the prompt data 735. In some embodiments, the prompt data 735 may further include an instruction for the task selection language model 740 to determine a priority of the one or more tasks (e.g., an ordered list representing the order in which the one or more tasks are to be completed). As discussed above, with respect to the plan prompt generation component 710, in some embodiments, the task selection prompt generation component 730 may also include in the prompt data 735 a sample processing format to be used by the task selection language model 740 when processing the prompt. Similarly, in some embodiments, the task selection prompt generation component 730 may generate the prompt data 735 according to a template format, such as:

{
Select the top prioritized task given the ultimate goal of [user input data 127 (or a representation of a determined intent included in the user input data 127]
Here are the completed tasks, their results, and user inputs so far:
[completed tasks, results of processing performed to complete the tasks, dialog history, context data 705, personalized context data 667]
Here are the task candidates:
[remaining tasks]
Return your selected task, return None if the goal is achieved or indicate existing ambiguities.
}

In some embodiments, the template format may instruct the task selection language model 740 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 730 may generate example prompt data 735*a:*

{
Select the top prioritized task given the ultimate goal of turn on all of the lights except the garage
Here are the completed tasks, their results, user inputs, and context so far:
[ ]
Here are the task candidates:
Turn on all of the lights except the garage light
Return your selected task, return None if the goal is achieved or indicate existing ambiguities.
}

For further example, for the second example user input provided above of "please order some pizza for dinner," the task selection prompt generation component 730 may generate example prompt data 735*a:*

```
{
Select the top prioritized task given the ultimate goal of
    please order some pizza for dinner
Here are the completed tasks, their results, user inputs and
    context so far:
Completed tasks:
    Identify user pizza preference: user ordered Brooklyn
        style pizza from [Company name]
Here are the task candidates:
find an application that sells pizza
find API that sells [Company name] pizza
Return your selected task, return None if the goal is
    achieved or indicate existing ambiguities.
}
```

In some embodiments, the task selection prompt generation component 730 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 740 processes the prompt data 735 to generate model output data representing the task to be completed first and/or a prioritization of the one or more tasks. For example, based on processing the first example prompt data provided above, the task selection language model 740 may output model output data: {"1. Turn on all of the lights except the garage light," } or the like. For further example, based on processing the second example prompt data provided above, the task selection language model 740 may output model output data: {"1. Find an API that sells [Company name] pizza," } or the like. In some embodiments, during processing of the task selection language model 740 to select and/or prioritize the one or more tasks, the task selection language model 740 may update the task list to remove any redundant and/or conflicting tasks. For example, for the second example prompt data, the task selection language model 740 may determine that the remaining tasks of "find an application that sells pizza" and "find an API that sells [Company name] pizza" are redundant, and that "find an API that sells [Company name] pizza has a higher priority. Therefore, the task selection language model 740 may remove the task of "find an application that sells pizza" from the remaining task list. Thereafter, the plan generation component 635 (or another component of the plan generation component 635) may process the model output data of the task selection language model 740 to determine task processing data 637 representing the user input data 127, the context data 705, the personalized context data 667, and/or the task selected by the task selection language model 740 to be completed first. In some embodiments, the task processing data 637 may include the remaining one or more tasks and/or may indicate the prioritization of the one or more tasks, as determined by the task selection language model 740. The task processing data 637 may be sent to the LLM shortlister component 640, which is described in detail herein below with respect to FIG. 8.

Figure 8:
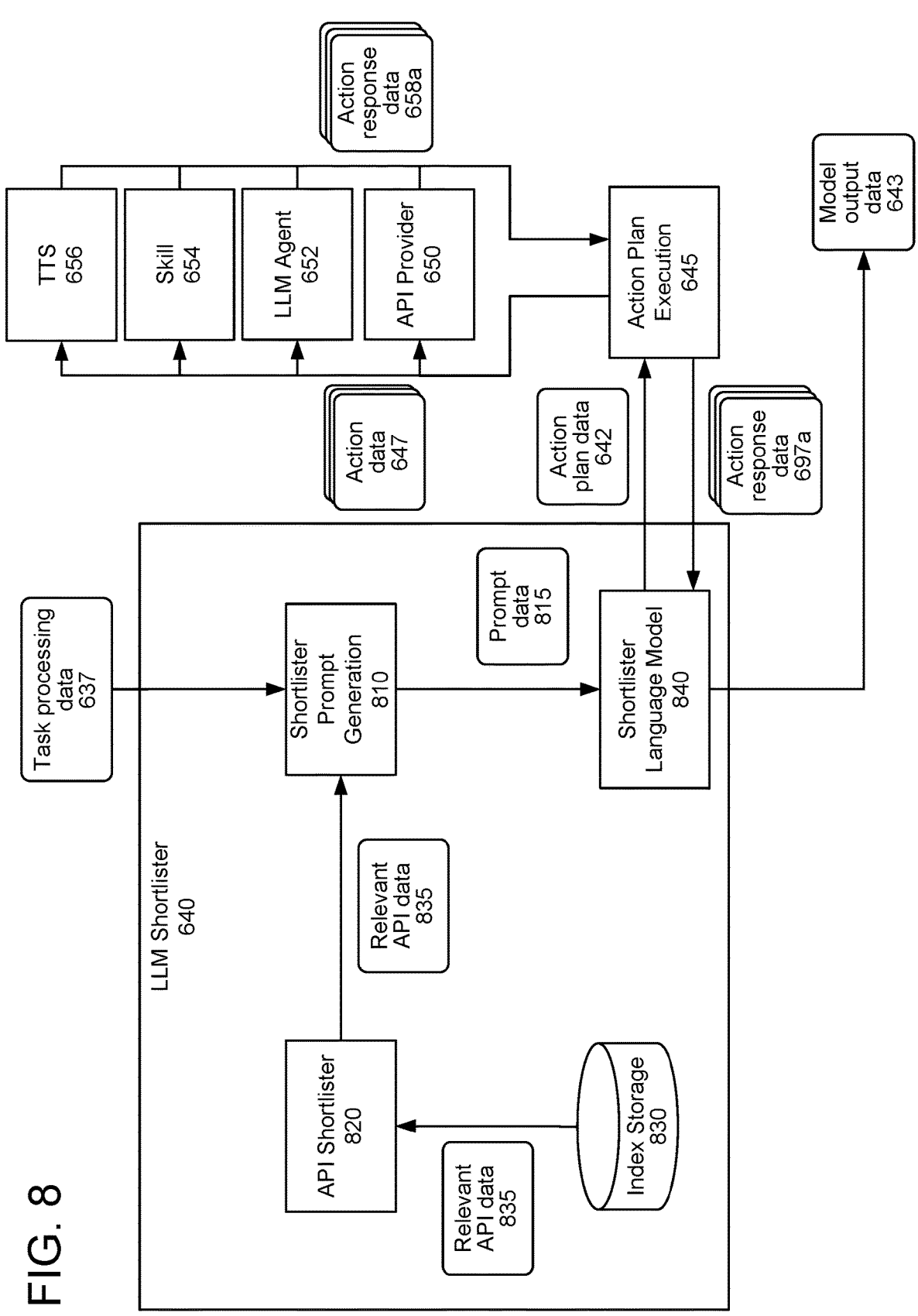
FIG. 8 is a conceptual diagram illustrating example components and processing of an LLM shortlister, according to embodiments of the present disclosure.

FIG. 8 illustrates example processing of the LLM shortlister component 640. As shown in FIG. 8, the LLM shortlister component 640 may include an index storage 830, an API shortlister component 820, a shortlister prompt generation component 810, and a shortlister language model 840.

As further shown in FIG. 8, the task processing data 637 is received at the shortlister prompt generation component 810. The shortlister prompt generation component 810 processes the task processing data 637 to generate prompt data 815 representing a prompt for input to the shortlister language model 840. In some embodiments, such prompt data 815 may be generated based on combining the task processing data 637 (e.g., the user input data 127, the selected task, remaining tasks, results from processing performed to complete one or more previous tasks, etc.) and relevant API data 835 representing one or more APIs associated with the user input data 127 and/or the current task.

The relevant API data 835 may be generated by the API shortlister component 820, which may be configured to retrieve one or more (e.g., top-k) relevant APIs associated with the user input data 127 or the current task. In some embodiments, the APIs may correspond to various components. For example, the components may correspond to rule-based components, ML-based components, LLM-based components, or the like, such as personalized context component 665, skill component(s) 654, LLM agent component(s) 652, TTS component 656, orchestrator component 1030, etc.) In some embodiments, the APIs may correspond to the components.

The API shortlister component 820 may use retrieval-based approaches to retrieve the one or more relevant APIs from the index storage 830, which may store various information associated with multiple APIs such as API descriptions, API arguments (e.g., parameter inputs/outputs), identifiers for components (e.g., such as personalized context component 665, skill component(s) 654, LLM agent component(s) 652, TTS component 656) that provides the API, etc. For example, the API shortlister component 820 may compare one or more APIs included in the index storage 830 to the user input or the current task to determine one or more APIs (top-k) that corresponds to the user input or the current task (e.g., APIs that are semantically similar to the user input or the current task, APIs that are capable of performing the current task, etc.). In some embodiments, the API shortlister component 820 (or another component of the API shortlister component 820) may determine an encoded representation of the user input or the current task and compare (e.g., using cosine similarity) the encoded representation(s) to an encoded representation of an API description for the API to determine whether the API is semantically similar to the user input or the current task. An API description may correspond to a description of the one or more actions that the API is configured to perform and/or other information associated with the API (e.g., an API call formatting structure (e.g., including input parameters), historical accuracy/defect rate, historical latency value, etc.). In some embodiments, the API description may further include one or more exemplars associated with use of the API (e.g., an example user input, corresponding API call, and example API output). If the value of semantic similarity meets or exceeds a threshold, the API (and, optionally, the API description) may be included in the relevant API data 835. In some embodiments, the API shortlister component 820 may determine the relevant API data 835 further using contextual information, including the context data 705, the personalized context data 667, an accuracy/defect rate value associated with the APIs, and/or a historical latency value associated with the APIs (e.g., which may be included in the description of the API). In some embodiments, the index storage 830 may be included in the API shortlister component 820. Similar processing may be performed to determine one or more components that are semantically similar to the user input or the current task, which may be included in the relevant API data 835. The API retrieval may send the relevant API data 835 to the shortlister prompt generation component 810.

In some embodiments, the prompt data 815 may be an instruction for the shortlister language model 840 to determine one or more APIs that are to process with respect to the user input or the current task (e.g., determine one or more API calls to cause the APIs to process) given the information (e.g., the user input data 127, the context data 705, the personalized context data 667, the current task, and the relevant API data 835). As discussed above, with respect to the plan prompt generation component 710 and the task selection prompt generation component 730, in some embodiments, the shortlister prompt generation component 810 may also include in the prompt data 815 a sample processing format to be used by the shortlister language model 840 when processing the prompt. Similarly, in some embodiments, the shortlister prompt generation component 810 may generate the prompt data 815 according to a template format, such as:
```
{
You are an AI agent to find and execute an API to
   complete the task of [Task]
Here are a list of relevant API available:
[relevant API]
Use the following format:
Thought: think about what to do
API: API calls compatible with the task
Observation: the result of the API call
Summary: summarized results from the API call
If no appropriate API is found, summarize as nothing is
   found.
}
```
Following such a template format, for example, and for a selected task of "turn on all of the lights except the garage light" and corresponding relevant API data, the shortlister prompt generation component 810 may generate example prompt data 815a:
```
{
You are an AI agent to find an execute an API to complete
   the task of turn on all of the lights except the garage
   light
Here are a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is
   found.
}
```
In some embodiments, the shortlister prompt generation component 810 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 840 processes the prompt data 815 to generate one or more API calls corresponding to request(s) that the corresponding APIs return a description of an action(s) that the APIs are configured to/will perform with respect to the user input and/or the current task. As such, in some embodiments, the shortlister language model 840 may generate API calls for a subset of the APIs represented in the prompt data 815. The shortlister language model 840 may generate the one or more APIs calls (including the required input parameters) by applying in-context learning for cold-starting APIs (e.g., one-shot/few-shot learning). For example, in embodiments where the relevant API data 835 includes the API descriptions, the shortlister language model 840 may use the one or more exemplars included in the API descriptions (included in the prompt data 815) to determine the one or more input parameters for the API call. In some embodiments, the shortlister language model 840 may be finetuned on such exemplars (e.g., during offline or runtime processing), such that the shortlister language model 840 is capable of determining the one or more input parameters for the given API call.

During processing of the shortlister language model 840 and after generating the one or more API calls, the shortlister language model 840 may cause the one or more API calls to be executed. For example, as shown in FIG. 8, the shortlister language model 840 may send action plan data 642 representing the one or more API calls to the action plan execution component 645, which causes execution of the one or more API calls included in the action plan data 642. For example, the action plan execution component 645 may process the action plan data 642 to generate action data 647a-n. Action data 647a may represent, for example, an instruction (e.g., an API call determined from the action plan data 642) for a particular API to process with respect to the user input and/or the current task. In some embodiments, the action plan execution component 645 may generate the action data 647a-n to represent an instruction to provide the description of the action performable/to be performed with respect to the user input and/or the current task.

The action plan execution component 645 may send the action data 647a-n to the API provider component 650, the LLM agent component 652, the skill component 654, the TTS component 656, and/or the orchestrator component 1030. The API provider component 650 may include one or more components (e.g., rule-based components, ML-based components, LLM-based components, or the like) that may be caused to process using the action data 647a-n (e.g., using the API calls generated by the LLM shortlister component 640).

As discussed herein above, the system 100 may include the TTS component 656, which may be configured to process textual or tokenized input to generate audio data representing synthesized speech corresponding to the textual or tokenized input spoken by a synthetic voice. The processing of the TTS component 656 is discussed in detail below with respect to FIG. 10.

The LLM agent component 652 may correspond to one or more LLM agents. An LLM agent component 652 may correspond to a custom instantiation of an LLM (and other components) that is configured to handle user inputs relating to a particular domain/functionality. In some embodiments, the LLM agent component 652 may be configured to handle specific use cases via particular prompt generation, finetuning of the LLM, etc. For example, the LLM agent component 652a may be configured to handle user inputs/tasks related to information query, the LLM agent component 652b may be configured handle user inputs/tasks related to shopping, the LLM agent component 652c may be configured to handle user inputs/tasks related to ordering food from various restaurants, the LLM agent component 652*d* may be configured to handle user inputs/tasks related to ordering food from a particular restaurant (e.g., a particular pizza restaurant), the LLM agent component 652*e* may be configured to handle user inputs/tasks related to booking a hotel, the LLM agent component 652*f* may be configured to handle user inputs/tasks related to booking a flight, etc.

The skill component 654 may be software running on the system component(s) 120 that is akin to a software application. That is, a skill component 654 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 654. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 654 may operate in conjunction between the system component(s) 120 and other devices, such as the user device 110, in order to complete certain functions. A skill component 654 may include hardware, software, firmware, or the like that may be dedicated to a particular skill component 654 or shared among different skill components 654.

As discussed above, the API provider component 650 may include various components that may be caused to execute using the action data 647*a-n*. For example, the API provider component 650 may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 647*a-n* may include an indication(s) (e.g., slots) of one or more entities included in the user input, as determined by one or more of the language models 720, 740, 840, in which case the ER component may process to link the one or more entities to the specific, referenced, entity known to the system 100.

In other embodiments, the ER component may be configured to process the action data 647*a-n* to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 650 may include a search component, which may be configured to query a storage (e.g., a database, repository, knowledge base, etc.) for information usable for generating a response to a user input. For example, if the action data 647*a-n* represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name].".

As an even further example, the API provider component 650 may include a device controller component, which may be configured to cause a device to perform an action corresponding to the action data 647*a-n*. For example, if the action represented by action data 647*a* is to turn on a living room light (e.g., "turn_on_device (device="living room light")), then the device controller component may identify the corresponding living room light, and instruct the living room light to power on (e.g., change its state to {state: ON}).

In some embodiments, the API provider component 650 may include a domain service component, which may be configured for interacting with one or more services defined by particular users, such as developers, specialists, or the like (e.g., to receive information, such as responses or annotations, to cause an action.

The API provider component 650, the LLM agent component 652, the skill component 654, and/or the TTS component 656 may send action response data 658*a-n* representing one or more responses generated by the one or more APIs corresponding to the action data 647*a-n* (e.g., the descriptions of the actions performable by the APIs with respect to the user input and/or the current task) to the action plan execution component 645. For example, in response to an API call to the skill component 654 associated with a user input for turning on a light, the action data 647*a* may correspond to "turn on the light," "turn_on_device ("light", [device ID])", or the like. For further example, in response to an API call to the skill component 654 associated with a user input for ordering a pizza from a particular restaurant, the action data 647*b* may correspond to "order medium pizza from [restaurant name]", "order_pizza ("medium", "pizza", "[restaurant name]")", or the like. The action plan execution component 645 may send the action response data 658*a-n* to the shortlister language model 840.

In some embodiments, the shortlister language model 840 may process the action response data 658*a-n* to generate a natural language summary of the action response data (e.g., the model output data 643). In some embodiments, the model output data 643 may include an association between action response data 658*a* (or a summarized representation of the action response data 658*a*) and an indication of the API/component that generated the action response data 658*a*

(e.g., a component identifier, API description, etc.). In some embodiments, the shortlister language model 840 may be configured to filter and/or rank the action response data 697*a-n* based on how relevant the action response data 697*a-n* is to the current task. In some embodiments, the shortlister language model 840 may be configured to filter and/or rank the action response data 697*a-n* based on a confidence level of the component that provided the response data, where the confidence level may indicate a likelihood of the component being able to respond (e.g., within a period of time), the component being able to perform an action that corresponds to the current task, etc. In some embodiments, the action response data 697*a-n* may indicate whether or not the corresponding component is able to respond (e.g., the action response data 697*a* may include a Boolean value such as "yes" or "no" or other similar indications). In some embodiments, the shortlister language model 840 may filter and/or rank the action response data 697*a-n* based on information included in the prompt data 815 (e.g., the user input data 127, the relevant API data 835, the personalized context data 667, the prompt data 715, etc.) For example, the model output data 643 may include a subset of the response data 697*a-n* (or the summarized representations of the action response data 697*a-n*) and may further include a representation of a confidence associated with the action response data 697*a* (or a summarized representation of the response data 697*a*). As such, the model output data 643 may further include data representing a confidence of how relevant the action response data 697*a* is to the current task. In some embodiments, the shortlister language model 840 may consider a rating associated with the component that provided the action response data 697, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

The LLM shortlister component 640 may send the model output data 643 for further processing. In instances where the plan generation component 635 determined that more than one task is to be completed in order to perform the action responsive to the user input data 127, the LLM shortlister component 640 may send the model output data 643 to the plan generation component 635, which may process as described herein above to maintain and prioritize the task list based on the model output data 643 and select a new task to be completed. In instances where the plan generation component 635 determined that only one task is to be completed, or in instances where the LLM shortlister component 640 determines that there are no remaining tasks to be completed, the LLM shortlister may send the model output data 643, and the results of processing performed with respect to the previously completed tasks (e.g., previous action response data) to the response arbitration component 660, which is discussed in detail herein below with respect to FIG. 9). The LLM shortlister component 640 may further send the user input data 127, the context data 705, the personalized context data 667, etc., to the plan generation component 635 and/or the response arbitration component 660.

In some embodiments, the LLM orchestrator component 630 may further include a memory storage (not illustrated) which may store various information associated with the processing performed (e.g., user input data 127, the prompt data 715, the context data 705 the personalized context data

667, the model output data 725, prompt data 735, the task processing data 637, the relevant API data 835, the prompt data 815, the action plan data 642, the action response data 658*a-n*, the model output data 643, etc.) during one or more previous iterations of processing by the LLM orchestrator component 630 for the user input data 127. As such, after the LLM shortlister component 640 generates the model output data 643, the LLM orchestrator component 630 may send the abovementioned data to the memory storage. In some embodiments, the above mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 710 may receive one or more portions of the data included in the memory storage (which were generated during one or more previous iterations of processing performed with respect to the user input data 127) and include the one or more portions of data in the prompt data 715.

As discussed herein above, the shortlister language model 840 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 840 may send data representing a request for such additional information to the response arbitration component 660. In some embodiments, the action plan data 642 may represent the request for additional information, and the action plan execution component 645 may be configured to send corresponding action data 647 to the personalized context component 665. For example, for the example provided herein above with respect to ordering pizza, the shortlister language model 840 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 665 to "identify user pizza preference" and the personalized context component 665 may process as described herein above to return personalized context data resolving the ambiguity (e.g., the user's pizza preference may be determined to be a cheese pizza or a pepperoni pizza).

Figure 9:
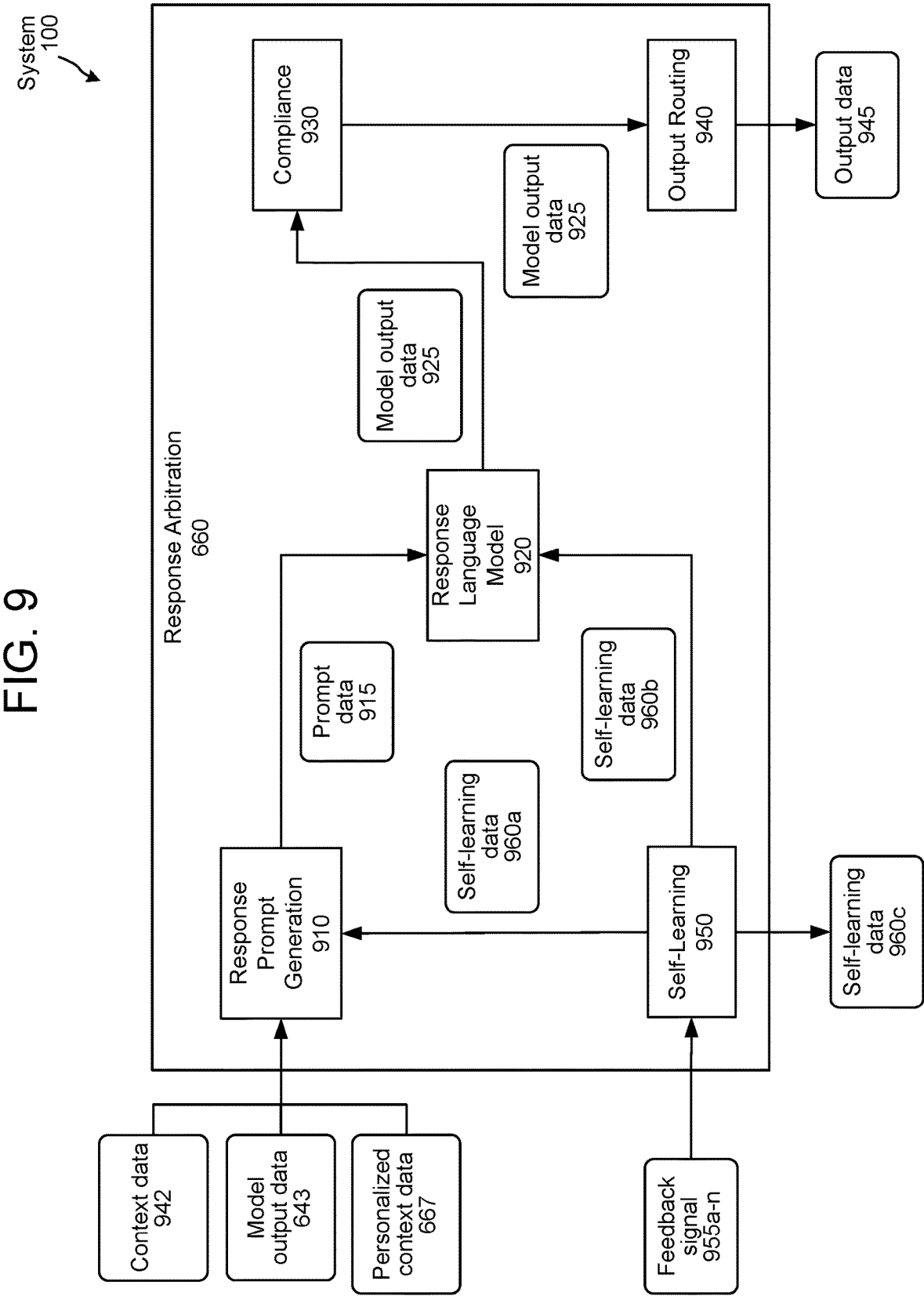
FIG. 9 is a conceptual diagram illustrating example component and processing of a response arbitration component, according to embodiments of the present disclosure.

As shown in FIG. 9, the response arbitration component 660 receives the model output data 643 (output by the LLM shortlister component 640) at the response prompt generation component 910. The response prompt generation component 910 may further receive personalized context data 667 (from the LLM shortlister component 640 or the personalized context component 665) and context data 942. In some embodiments, the context data 942 may correspond to various contextual information associated with the user input (e.g., dialog history data, historical user input data, weather data, time of day, user ID, device information associated with the device that sent the user input data 127 (e.g., device ID, device states, historical device interaction data, etc.), etc.). As discussed herein below, the response arbitration component 660 may further receive additional information from the LLM shortlister component 640, such as the potential responses of processing performed with respect to previous tasks (e.g., previous action response data) associated with the user input, and the user input data 127.

The personalized context data 667 may represent one or more contextual signals associated with the user 105, such as information associated with a user profile of the user 105 (e.g., user ID, user behavioral information, user preferences, age, gender, historical user interaction data, devices associated with the user profile, etc.), which may be determined using, for example, a user recognition component 1095. In some embodiments, an indication of the user 105 and/or user profile may be included in the user input data 127 (e.g., as included in the output of the ASR component 650.). In some embodiments, the personalized context data 667 may include dialog history data representing one or more user inputs and corresponding system-generated responses for a current interaction between the user 105 and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 910 may process the model output data 643, context data 942, and the personalized context data 667 (and, optionally, the further information received from the LLM shortlister component 640) to generate prompt data 915 representing a prompt for input to the response language model 920. In some embodiments, the prompt data 915 may be an instruction for the response language model 920 to determine whether one or more of the potential responses represented in the model output data 643 are responsive to the user input given the other information (e.g., the personalized context data 667, the context data 942, the potential responses associated with the previous tasks (e.g., previous action response data) associated with the user input, and the user input data 127) included in the prompt data 915. The prompt data may further be an instruction for the response language model 920 to, if the response language model 920 determines that one or more of the potential responses are responsive to the user input, cause performance of the one or more corresponding actions (e.g., the one or more potential actions included in the selected responses) and/or cause the system 100 to inform the user 105 of the one or more selected responses. For example, in some embodiments, prompt data 915 may further instruct the response language model 920 to generate a natural language summary of the one or more selected responses determined to be responsive to the user input. The prompt data 915 may instruct the response language model 920 to cause the system 100 to output the natural language summary to the user 105.

In some embodiments, the prompt data 915 may further be an instruction for the response language model 920 to, if the response language model 920 determines that none of the potential responses are responsive to the user input, generate a request for additional information from a component of the system 100 and/or the user 105. As discussed above, the additional information may be any information usable to determine and/or perform an action responsive to the user input (e.g., to resolve an ambiguity associated with the user input and/or a task(s) associated with the user input).

In some embodiments, the response prompt generation component 910 may also include in the prompt data 915 a sample processing format to be used by the response language model 920 when processing the prompt. In some embodiments, the response prompt generation component 910 may generate the prompt data 915 according to a template format. For example, the prompt data 915 may adhere to a template format including:

{

"You are a conversational AI agent that communicates with users to satisfy their request or ask clarification questions. If applicable, summarize the responses that satisfy the user's request. If applicable, call the corresponding API's to perform the potential actions that satisfy the user's request. If no response is needed, indicate that."

Here is the user's request:

[user input data 127]

Here are the potential responses

[model output data 643]

}

In some embodiments, the template format may instruct the response language model 920 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 920 to generate an output representing whether one or more of the potential responses are determined to be responsive to the user input or whether additional information is needed. In some embodiments, the format may further include an indication of "Response:" instructing the response language model 920 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the LLM shortlister component 640, the response prompt generation component 910 may generate example prompt data 215a:

{

"You are a conversational AI agent that communicates with users to satisfy their request or ask clarification questions. If no response is needed, indicate that."

Here is the user's request:

What is the weather for today

Here are the potential responses and potential actions:

Skill component A: It is currently 70 degrees, with a high of 75 and a low of 68

Skill component B: The weather for today is expected to be mostly sunny, but with a chance of rain in the late afternoon

}

For further example, and for the example user input of "please order some pizza for dinner" and corresponding potential responses output by the LLM shortlister component 640, the response prompt generation component 910 may generate example prompt data 215*b*:

{

"You are a conversational AI agent that communicates with users to satisfy their request or ask clarification questions. If no response is needed, indicate that."

Here is the user's request:

Please order some pizza for dinner

Here are the potential responses and potential actions:

Component A: User ordered Brooklyn style pizza from [Company 1 name]

API A: Use [Application 1 name] to order pizza from [Company 1 name]

API B: Use [Application 2 name] to order pizza from [Company 2 name]

}

In some embodiments, the response prompt generation component 910 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 915 may include "Please generate a polite, respectful, and safe response and one that does not violate protected class policy."

The response language model 920 processes the prompt data 915 to generate model output data 925 representing the one or more selected responses determined to be responsive to the user input, the natural language summary of the one or more selected responses, or the request for additional information.

If the response language model 920 determines that one or more of the potential responses are responsive to the user input, the response language model 920 may generate model output data 925 representing the one or more selected responses, or a natural language summary of the one or more selected responses, to be output to the user. For example, based on processing the first example prompt data above, the response language model 920 may select one of the potential responses (e.g., the potential responses from skill component A (e.g., a weather skill component)) determined to be responsive to the user input to generate model output data 225*a*: {" It is currently 70 degrees, with a high of 75 and a low of 68," } or the like. For further example, based on processing the first example prompt data provided above, the response language model 920 may select more than one of the potential responses (e.g., the potential responses from both the skill component A and skill component B) determined to be responsive to the user input and generate a summary of the selected responses to generate model output data 225*b*: {"It is expected to be mostly sunny today, with a high of 75 and a low of 68, but with a chance of rain in the late afternoon," } or the like.

As another example, based on processing the second example prompt data provided above, the response language model 920 may select one of the potential responses (e.g., the potential response from Component A (e.g., the personalized context component 665) representing that the user order Brooklyn style pizza from [Company 1 name]) determined to be responsive to the user input to generate model output data 225*a*: {"Ok, I will place an order for Brooklyn style pizza from [Company 1 name]," } or the like. As a further example, based on processing the second example prompt data provided above, the response language model 920 may select more than one of the potential responses (e.g., the potential responses from both component A and API A) determined to be responsive to the user input and generate a summary of the selected responses to generate model output data 225*b*: {"Ok, I will place an order for Brooklyn style pizza from [Company name] using [Application 1 name]," } or the like.

As such, the response language model 920 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 920 may cause output of the selected responses (e.g., the subset of potential responses) or a natural language summary of the selected responses to the user.

In some embodiments, the response arbitration component 660 may also generate and send an instruction to the components, (e.g., API(s), components, agents, etc. as discussed herein below with respect to FIG. 5) configured to perform the potential actions included in the selected responses to cause performance of the potential actions (or another component of the system 100 configured to cause the components to perform the potential actions, such as the action plan execution component 645, which is discussed in more detail herein below). For example, in instances where the selected responses include a potential action to be performed, the response language model 920 may further cause the corresponding components to perform the potential action (e.g., cause API A to order the Brooklyn style pizza from [Company 1 name] using [Application 1 name]). In other embodiments, the system 100 may not generate and/or send the instruction until approval to perform the action(s) is received from the user 105.

If the response language model 920 determines that none of the potential responses are responsive to the user input and/or that an ambiguity exists with respect to the user input and/or one or more of the determined tasks, the response language model 920 may generate model output data 925 representing a request to be output to the user and/or the personalized context component 665. For example, based on processing the first example prompt data provided above, the response language model 920 may determine an ambiguity exists with respect to the size of the pizza to be ordered and may generate model output data 225*c*: {"What size pizza should I order?",} {"What size pizza does the user usually order?",} or the like to be output to the user and/or sent to the personalized context component 665.

As further discussed herein below, one or more of the components discussed herein (e.g., the plan generation component 635 and/or the LLM shortlister component 640) may be capable of determining whether an ambiguity exists in the user input or the current task, and may determine that additional information is needed. In response to such a determination, the component(s) may be further configured to send a request for such additional information to the response arbitration component 660, which may process as described herein to generate a request for the additional information to be sent to the personalized context component 665 or output to the user 105 to solicit the additional information. In some embodiments, the response arbitration component 660 may send the request for additional information to the action plan execution component 645, which may cause output of the request to the user 105 to solicit the additional information.

The response language model 920 may send the model output data 925 to the compliance component 930, which is configured to determine whether model output data generated by the response language model 920 is appropriate for output to the user 105. In other words, the compliance component 930 processes the model output data 925 to determine whether the model output data 925 includes any inappropriate/sensitive information that should not be output to the user 105 (e.g., confidential information, offensive language, etc.). In some embodiments, the compliance component 930 may be configured to compare the model output data 925 to one or more words determined to be inappropriate/sensitive and should not be output to the user 105. In some embodiments, the compliance component 930 may include/implement an ML model. For example, the ML model may process the model output data 925 to determine whether the model output data 925 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 930 indicates that the model output data 925 includes information that is not appropriate for output to the user 105, the compliance component 930 may cause further processing of the model output data 925 by downstream components to halt. In some embodiments, the response arbitration component 660 may cause the response language model 920 to generate new model output data 925 to be evaluated by the compliance component 930. For example, the response arbitration component 660 may cause the response prompt generation component 910 to generate new prompt data, which may include the prompt data 915, the model output data 925, and an indication that the model output data 925 is not appropriate for output to the user 105. The new prompt data may be an instruction to generate new model output data that is appropriate for output to the user 105.

If the output of the compliance component 930 indicates that the model output data 925 is appropriate for output to the user, the compliance component 930 may send the model output data 925 to the output routing component 940. The output routing component 940 processes the model output data 925 to determine one or more components that are to be caused to process in response to the model output data 925. In other words, the output routing component 940 parses the model output data 925 to determine one or more components that the model output data 925 is to be routed to (or that are to be caused to process based on the model output data 925).

For example, in an instance where the response language model 920 determines that one or more of the potential responses are responsive to the user input and generates model output data 925 including the one or more selected responses (or a natural language summary of the one or more selected responses), the output routing component 940 may parse the model output data 925 to determine the selected responses/the natural language summary and send output data 945 corresponding to the selected responses/the natural language summary to a component configured to generate corresponding data to be output to the user 105. For example, the output routing component 940 may send the output data 945 to a TTS component (e.g., the TTS component 656), which may process as described herein below to generate output audio data including synthesized speech corresponding to the output data 945, which the system 100 may send to the user device 110 for output to the user 105. In some embodiments, the system 100 may further include a component configured to generate visual output data (e.g., output image and/or video data) corresponding to the output data 945, which may be sent to the user device 110 to be output to the user.

For further example, in embodiments where the model output data 925 includes selected responses that include one or more potential actions to be performed, the output routing component 940 may process as described herein above to determine the one or more selected responses/the natural language summary and send the output data 945 to the one or more components associated with the selected responses. In such embodiments, the output data 945 may further include an instruction for the one or more components to perform the potential actions corresponding to the selected responses. For example, in some embodiments, the components corresponding to the potential responses included in the model output data 643 may, after generating the potential responses, suspend processing required to perform the potential action included in the potential responses and await an instruction from the system 100 to perform the potential action. As such, the output routing component 940 may include the instruction in the output data 945 to cause the component to perform the potential action. In some embodiments, the output routing component 940 may generate an API call configured to cause the component to perform the action.

In some embodiments, where the model output data 925 includes selected responses that include one or more potential actions to be performed, the output data 945 may further request authorization from the user 105 to perform the one or more potential actions responsive to the user input. After receiving the request authorization (e.g., via a subsequent user input) the response arbitration component 660 may generate and send the corresponding instruction (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 660 may use such data as authorization to perform the one or more potential actions. For example, the user 105 may have previously provided authorization for a set of actions (e.g., turning on outside lights). Thereafter, the system 100 may determine the one or more potential actions to be performed in response to the user input data 127. If the system 100 determines that the one or more actions are included in the set of actions previously authorized by the user 105, the system 100 may not ask for further authorization prior to causing the one or more potential actions to be performed.

For further example, in an instance where the response language model 920 generates model output data 925 including a request for additional information (in response to the response language model 920 determining that none of the potential responses are responsive to the user input and/or an ambiguity exists with respect to the user input and/or one or more of the tasks), which may be determined by the output routing component 940 based on, for example, the model output data 925 including a question, the output routing component 940 may parse the model output data 925 to determine whether the request for additional information is to be sent to the personalized context component 665 and/or output to the user 105. In some embodiments, the response language model 920 may include in the model output data 925 an indication of whether the request for additional information should be sent to the personalized context component 665 and/or output to the user 105. In some embodiments, unless otherwise indicated in the model output data 925, the output routing component 940 may determine to send the request for additional information to the personalized context component 665 prior to outputting the request for additional information to the user 105. In the instance where the personalized context component 665 is unable to resolve the ambiguity (or a component of the system 100 is unable to resolve the ambiguity using the personalized context data generated by the personalized context component 665), the output routing component 940 may determine the request for additional information is to be output to the user 105.

The output data 945 may be sent to the personalized context component 665. As discussed above, the output data 945 may be sent to the personalized context component 665 based on the model output data 925 including a request for additional information and the output routing component 940 determining the request for additional information is to be sent to the personalized context component 665. The personalized context component 665 may process to generate personalized context data associated with the output data 945 (e.g., the request for additional information). The personalized context data may then be sent to another component of the system 100, such as the plan generation component 635, the LLM shortlister component 640, and/or the response arbitration component 660, which may process as discussed herein above.

The personalized context component 665 may be configured to determine and return contextual information associated with a user input. In some embodiments, the personalized context component 665 may query various components and/or storages (e.g., the profile storage 1070) for the contextual information. In some embodiments, the personalized context component 665 may include a storage including one or more portions of the contextual information. In other embodiments, the personalized context component 665 may be/implement an LLM. In such embodiments, the personalized context component 665 may be finetuned on personalized information for one or more users, as is discussed in more detail herein below. Further, in such embodiments, the personalized context component 665 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 667) associated with the prompt.

The output data 945 may be sent to the one or more of the TTS component 656, the skill component 654, the LLM agent component 652, and/or the API provider component 650 (e.g., a device controller component).

The TTS component 656 may be configured to process textual or tokenized input to generate audio data representing synthesized speech corresponding to the textual or tokenized input spoken by a synthetic voice. The processing of the TTS component 656 is discussed in detail below with respect to FIG. 10.

The skill component 654 may be software running on the system component(s) 120 that is akin to a software application. That is, a skill component 654 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 654. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 654 may operate in conjunction between the system component(s) 120 and other devices, such as the user device 110, in order to complete certain functions. A skill component 654 may include hardware, software, firmware, or the like that may be dedicated to a particular skill component 654 or shared among different skill components 654.

The LLM agent component 652 may correspond to one or more LLM agents. An LLM agent component 652 may correspond to a custom instantiation of an LLM (and other components) that is configured to handle user inputs relating to a particular domain/functionality. In some embodiments, the LLM agent component 652 may be configured to handle specific use cases via particular prompt generation, fine-tuning of the LLM, etc. For example, the LLM agent component 652*a* may be configured to handle user inputs/tasks related to information query, the LLM agent component 652*b* may be configured handle user inputs/tasks related to shopping, the LLM agent component 652*c* may be configured to handle user inputs/tasks related to ordering food from various restaurants, the LLM agent component 652*d* may be configured to handle user inputs/tasks related to ordering food from a particular restaurant (e.g., a particular pizza restaurant), the LLM agent component 652*e* may be configured to handle user inputs/tasks related to booking a hotel, the LLM agent component 652*f* may be configured to handle user inputs/tasks related to booking a flight, etc.

For example, the TTS component 656 may process as discussed herein above to generate output audio data corresponding to the output data 945 (e.g., output audio data corresponding to the one or more actions/natural language summary responsive to the user input, the request for additional information, etc.). Thereafter, the system 100 may send the output audio data to the device 110 for output to the user 105. For further example, the LLM agent component 652 may process as discussed herein above to cause the corresponding one or more actions corresponding to the output data 945 to be performed. As another example, a device controller component of the API provider component 650 may cause a device to perform an action corresponding to the output data 945. For example, if the action represented by output data 945 is to turn on a living room light (e.g., "turn_on_device (device="living room light")), then the device controller component may identify the corresponding living room light, and instruct the living room light to power on (e.g., change its state to {state: ON}).

In some embodiments, the output data 945 may be sent to the action plan execution component 645, which may send the output data 945 to the corresponding component/API (e.g., the TTS component 656, the skill component 654, the LLM agent component 652, the API provider component 650, etc.).

In some embodiments, the response arbitration component 660 may be configured to further process data representing a potential responses potentially responsive to the user input that is generated by one or more other components of the system 100 not included in the LLM orchestrator component 630. For example, the response arbitration component 660 may further receive data from an orchestrator component 1030 (discussed in detail herein below with respect to FIG. 10) representing a potential response to the user input (e.g., the output of the skill component 654), where the orchestration of the processing performed to generate the potential response was performed by the orchestrator component 1030, rather than the LLM orchestrator component 630. In such embodiments, the response arbitration component 660 may be further configured to arbitrate between first potential responses received as a result of the processing of the LLM orchestrator component 630 and second potential responses received as a result of the processing of the orchestrator component 1030. As discussed above, the response arbitration component 660 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1030 may be included in the model output data 643. For example, the orchestrator component 1030 may be determined to be configured to perform a function (e.g., cause another component(s) to perform a function) potentially relevant to the user input such that the LLM shortlister component 640 may cause the orchestrator component 1030 to generate potential responses potentially responsive to the user input, which may be included in the model output data 643 sent to the response arbitration component 660. Further details regarding the processing of the LLM shortlister component 640 to generate the model output data 643 are discussed herein below with respect to FIG. 8.

As discussed above, the response arbitration component may include a self-learning component 950. The self-learning component 950 may be configured to collect, store, and distribute various feedback associated with the processing of the one or more components, discussed herein above, with respect to a user input. The self-learning component 950 may use the feedback to cause the one or more components to be updated/trained based on the various feedback. In some embodiments, the self-learning component 950 may be located elsewhere in the system 100, outside of the response arbitration component 660.

For example, the self-learning component 950 may collect and store various information (e.g., feedback signal 955a-n) associated with processing with respect to a user input, such as a determined task(s) associated with performance of an action responsive to the user input, a selected task, a prioritization of tasks, a selected API(s), an API-generated potential response(s), interaction history data, dialog history data, or any other data generated during the processing discussed herein below with respect to FIGS. 7-8. The self-learning component 950 may further collect information (e.g., feedback signal 955a-n) associated with a user satisfaction with the processing of the system 100. The self-learning component 950 may determine such user satisfaction information based on implicit and explicit feedback signals (e.g., feedback signal 955a-n). For example, an explicit feedback signal 955a may be a follow-up user input associated with the response generated by the system 100 (e.g., "Add milk, please."), the response arbitration component 660 receiving varying results from processing performed by the orchestrator component 1030 and the LLM orchestrator component 630 (e.g., a first potential response from the orchestrator component 1030 including a potential action of "add milk to your grocery list" and a second potential response from the LLM orchestrator component 630 including a request for additional information of "can you specify the list?"), a request for additional information output to the user and the user's corresponding response, a system-determined quality of a generated request for additional information, etc.

For further example, an implicit feedback signal 955b may be a follow-up user input associated with the response generated by the system 100 (e.g., "Add milk, please."), the response arbitration component 660 receiving varying results from processing performed by the orchestrator component 1030 and the LLM orchestrator component 630 (e.g., a first potential response from the orchestrator component 1030 including a potential action of "add milk to your grocery list" and a second potential response from the LLM orchestrator component 630 including a potential action of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., feedback signal 255a-n) collected by the self-learning component 950 may be used to update/train one or more components of the arbitration component. For example, if a user previously provided a follow-up user input requesting that future outputs be kept to a minimal amount of words, the self-learning component 950 may receive the follow-up user input as an explicit feedback signal 955a and may use the explicit feedback signal 955a to update the response prompt generation component 910. As shown in FIG. 2, the self-learning component 950 may generate self-learning data 960a/260b representing training data including the explicit feedback signal 955a and send the self-learning data 960a to the response prompt generation component 910 and/or send the self-learning data 960b to the response language model 920. The response prompt generation component 910 may be updated/trained based on the self-learning data 960a such that, for a user input associated with the user that provided the follow-up user input, the response prompt generation component 910 may include in the prompt data an indication that the response language model 920 should generate a short and concise response to the user. The response language model 920 may be updated/trained based on the self-learning data 960*b* such that the response language model 920 is better configured for generating short and concise responses. In some embodiments, the various data (e.g., feedback signal 255*a-n*) collected by the self-learning component 950 may be used by the system 100 to update/train one or more components of the system 100. In such embodiments, the self-learning component 950 may send the self-learning data 960*c* to another component of the system 100 to update/train the component. For further example, if a user previously provided a follow-up user input of "Add milk, please," in response to a system-generated response to a user input of "Add eggs to my list", the self-learning component 950 may receive the follow-up user input as an explicit feedback signal 955*b* and may use the explicit feedback signal 955*b* to update a user profile associated with the user (e.g., represented in the profile storage 1070) and/or update a storage/index of the personalized context component 665. The self-learning component 950 may generate self-learning data 960*c* representing training data including the explicit feedback signal 955*b* and send the self-learning data 960*c* to the profile storage 1070 and/or the personalized context component 665. For example, the personalized context component 665 may be updated/trained based on the self-learning data 960*c* such that processing of a similar future input of "Add eggs to my list" may result in the personalized context component 665 generating personalized context data representing that the user has previously also added milk to their list. The system 100 may use this personalized context data to generate a response of "Would you also like me to add milk to your list?".

In some embodiments, the language models 720, 740, 840, 920 may be fine-tuned to perform a particular task(s). Fine-tuning of the language models 720, 740, 840, 920 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 720, the task selection language model 740, and/or the shortlister language model 840 indicates that additional information is needed to complete a first task associated with a user input, a request for the additional information may be sent to the personalized context component 665. Thereafter, the plan generation language model 720, the task selection language model 740, and/or the shortlister language model 840 may continue to process to complete their configured operations. For example, while the personalized context component 665 is processing to determine the additional information, the system 100 may begin processing with respect to a second task associated with the user input. Thereafter, the output of the personalized context component 665 may be sent to the response arbitration component 660 such that once the response arbitration component 660 receives the output of the LLM shortlister component 640, the response arbitration component 660 may resolve the ambiguity that resulted in the request for additional information in order to generate the output data 662. For further example, if the user input data 127 is generated to include the natural language representation of the user input, but the processing required to determine the corresponding contextual signals (e.g., weather data, time of data, dialog history, device information, etc.) is yet to be completed, the plan generation component 635 may begin processing with respect to the natural language representation of the user input. Once the corresponding contextual signals have been generated, the plan generation component 635 may begin processing with respect to the contextual signals and may update downstream components with the result of the processing with respect to the contextual signals.

As another example, if the API shortlister component 820 determines (e.g., with a confidence value that meets or exceeds a particular threshold) that a particular API or API description should be included in the relevant API data, the API shortlister component 820 may provide the corresponding relevant API data to the shortlister prompt generation component 810 so that the shortlister prompt generation component 810 may begin processing with respect to the relevant API data while the API shortlister component 820 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

In some embodiments, one or more of the components discussed herein above may be updated/trained based on various feedback associated with the processing of the one or more components with respect to a user input. For example, the system 100 may include a component that collects and stores various information determined during processing with respect to a user input (e.g., a determined task, a selected task, a prioritization of tasks, a selected API, a generated response, interaction history, dialog history, etc.). The component may further collect information associated with a user satisfaction with the processing of the system 100. The component may determine such user satisfaction information based on implicit and explicit feedback signals. For example, an explicit feedback signal may be a follow-up user input associated with the response generated by the system 100 (e.g., "Add milk, please."), the response arbitration component 660 receiving varying responses from processing performed by the orchestrator component 1030 and the LLM orchestrator component 630 (e.g., a first response from the orchestrator component 1030 of "add milk to your grocery list" and a second response from the LLM orchestrator component 630 of "can you specify the list?"), a request for additional information output to the user and the user's corresponding response, a system-determined quality of a generated request for clarifying information, etc.

For further example, an implicit feedback signal may be a follow-up user input associated with the response generated by the system 100 (e.g., "Add milk, please."), the response arbitration component 660 receiving varying responses from processing performed by the orchestrator component 1030 and the LLM orchestrator component 630 (e.g., a first response from the orchestrator component 1030 of "add milk to your grocery list" and a second response from the LLM orchestrator component 630 of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., the feedback signals) collected by the component may be used by the system 100 to update/train one or more components of the system 100. For example, if a user previously provided a follow-up user input of "Add milk, please," in response to a system-generated response to a user input of "Add eggs to my list", the system 100 may use the explicit feedback signal to update one or more components of the system 100 such that processing of a similar future input of "Add eggs to my list" may result in generation of a response of "Would you also like me to add milk to your list?"

Figure 10:
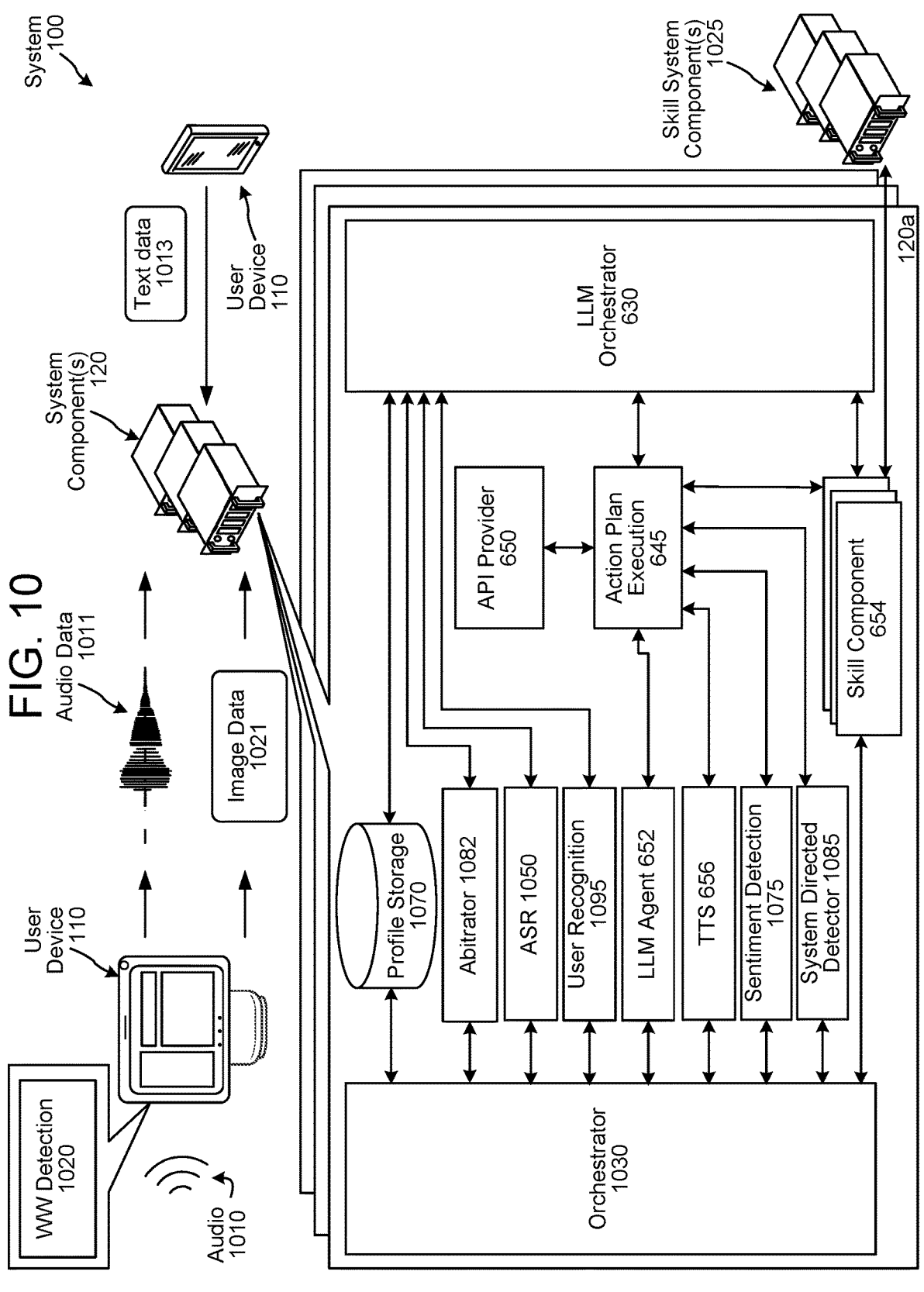
FIG. 10 is a conceptual diagram of components of the system, according to embodiments of the present disclosure.

The system 100 may operate using various components as described in FIG. 10. The various components may be located on same or different physical devices. Communication between various components may occur directly or across a network(s) 199. The user device 110 may include audio capture component(s), such as a microphone or array of microphones of a user device 110, captures audio 1011 and creates corresponding audio data. Once speech is detected in audio data representing the audio 1011, the user device 110 may determine if the speech is directed at the user device 110/system component(s). In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of user device 110. Other input forms may include indication that the user has pressed a physical or virtual button on user device 110, the user has made a gesture, etc. The user device 110 may also capture images using camera(s) 1318 of the user device 110 and may send image data 1021 representing those image(s) to the system component(s). The image data 1021 may include raw image data or image data processed by the user device 110 before sending to the system component(s). The image data 1021 may be used in various manners by different components of the system to perform operations such as determining whether a user is directing an utterance to the system, interpreting a user command, responding to a user command, etc.

The wakeword detection component 1020 of the user device 110 may process the audio data, representing the audio 1011, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1011, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Followon posterior threshold tuning or smoothing is applied for decision making. Other techniques for wakeword detection, such as those known in the art, may also be used.

Once the wakeword is detected by the wakeword detection component 1020 and/or input is detected by an input detector, the user device 110 may "wake" and begin transmitting audio data 1011, representing the audio 1011, to the system component(s) 120. The audio data 1011 may include data corresponding to the wakeword; in other embodiments, the portion of the audio corresponding to the wakeword is removed by the user device 110 prior to sending the audio data 1011 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1020 may result in sending audio data to system component(s)a for processing while detection of the wakeword "Computer" by the wakeword detector may result in sending audio data to system component(s)b for processing. The system may have a separate wakeword and system for different skills/systems (e.g., "Dungeon Master" for a game play skill/system component(s)c) and/or such skills/systems may be coordinated by one or more skill component(s) 654 of one or more system component(s) 120.

The user device 110 may also include a system directed input detector 1285. (The system component(s) may also include a system directed input detector 1085 which may operate in a manner similar to system directed input detector 1285.) The system directed input detector 1285 may be configured to determine whether an input to the system (for example speech, a gesture, etc.) is directed to the system or not directed to the system (for example directed to another user, etc.). The system directed input detector 1285 may work in conjunction with the wakeword detection component 1020. If the system directed input detector 1285 determines an input is directed to the system, the user device 110 may "wake" and begin sending captured data for further processing (for example, processing audio data using language processing 1092/1292, processing captured image data using image processing component 1040/1240 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1285 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1285 is determining whether an input is potentially device directed. For example, the system may output an orange indicator while considering an input, and may output a green indicator if a system directed input is detected. Other such configurations are possible.

Upon receipt by the system component(s) 120, the audio data 1011 may be sent to an orchestrator component 1030 and/or the LLM orchestrator component 630. The orchestrator component 1030 may include memory and logic that enables the orchestrator component 1030 to transmit various pieces and forms of data to various components of the system, as well as perform other operations as described herein. In some embodiments, the orchestrator component 1030 may optionally be included in the system component(s) 120. In embodiments where the orchestrator component 1030 is not included in the system component(s) 120, the audio data 1011 may be sent directly to the LLM orchestrator component 630. Further, in such embodiments, each of the components of the system component(s) 120 may be configured to interact with the LLM orchestrator component 630, the action plan execution component 645, and/or the API provider component 650.

In some embodiments, the system component(s) 120 may include an arbitrator component 1082, which may be configured to determine whether the orchestrator component 1030 and/or the LLM orchestrator component 630 are to process with respect to the audio data 1011. In some embodiments, the LLM orchestrator component 630 may be selected to process with respect to the audio data 1011 only if the user 105 associated with the audio data 1011 (or the user device 110 that captured the audio 1010) has previously indicated that the LLM orchestrator component 630 may be selected to process with respect to user inputs received from the user 105.

In some embodiments, the arbitrator component 1082 may determine the orchestrator component 1030 and/or the LLM orchestrator component 630 are to process with respect to the audio data 1011 based on metadata associated with the audio data 1011. For example, the arbitrator component 1082 may be a classifier configured to process a natural language representation of the audio data 1011 (e.g., output by the ASR component 1050) and classify the corresponding user input as requiring the processing of the orchestrator component 1030 and/or the LLM orchestrator component 630. For further example, the arbitrator component 1082 may determine whether the device from which the audio data 1011 is received is associated with an indicator representing the audio data 1011 is to be processed by the orchestrator component 1030 and/or the LLM orchestrator component 630. As an even further example, the arbitrator component 1082 may determine whether the user (e.g., determined using data output from the user recognition component 1095) from which the audio data 1011 is received is associated with a user profile including an indicator representing the audio data 1011 is to be processed by the orchestrator component 1030 and/or the LLM orchestrator component 630. As another example, the arbitrator component 1082 may determine whether the audio data 1011 (or the output of the ASR component 1050) corresponds to a request representing that the audio data 1011 is to be processed by the orchestrator component 1030 and/or the LLM orchestrator component 630 (e.g., a request including "let's chat" may represent that the audio data 1011 is to be processed by the LLM orchestrator component 630). In some embodiments, if the arbitrator component 1082 is unsure (e.g., a confidence score corresponding to whether the orchestrator component 1030 and/or the LLM orchestrator component 630 is to process is below a threshold), then the arbitrator component 1082 may send the audio data 1011 to both of the orchestrator component 1030 and the LLM orchestrator component 630. In such embodiments, the orchestrator component 1030 and/or the LLM orchestrator component 630 may include further logic for determining further confidence scores during processing representing whether the orchestrator component 1030 and/or the LLM orchestrator component 630 should continue processing.

The arbitrator component 1082 may send the audio data 1011 to an ASR component 1050. In some embodiments, the component selected to process the audio data 1011 (e.g., the orchestrator component 1030 and/or the LLM orchestrator component 630) may send the audio data 1011 to the ASR component 1050. The ASR component 1050 may transcribe the audio data 1011 into text data. The text data output by the ASR component 1050 represents one or more than one (e.g., in the form of an N-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., acoustic units such as phonemes, senons, phones, etc.) and sequences of sounds to identify words that match the sequence of sounds of the speech represented in the audio data 1011. The ASR component 1050 sends the ASR data generated thereby to the arbitrator component 1082, the orchestrator component 1030, and/or the LLM orchestrator component 630. In instances where the text data is sent to the arbitrator component 1082, the arbitrator component 1082 may send the text data to the component selected to process the audio data 1011 (e.g., the orchestrator component 1030 and/or the LLM orchestrator component 630). The text data sent from the ASR component 1050 to the arbitrator component 1082, the orchestrator component 1030, and/or the LLM orchestrator component 630 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 1030 may cause a NLU component (not shown) to perform processing with respect to the ASR data generated by the ASR component 1050. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill component 654, a skill system component(s) 1025, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 105. However, if the NLU component is unable to resolve the entity—for example, because the entity is referred to by anaphora such as "this song" or "my next appointment"—the system can send a decode request to another speech processing system for information regarding the entity mention and/or other context related to the utterance. The speech processing system may augment, correct, or base results data upon the ASR data as well as any data received from the system.

The NLU component may return NLU results data (which may include tagged text data, indicators of intent, etc.) back to the orchestrator component 1030. The orchestrator component 1030 may forward the NLU results data to a skill component(s) 654. If the NLU results data includes a single NLU hypothesis, the NLU component and the orchestrator component 1030 may direct the NLU results data to the skill component(s) 654 associated with the NLU hypothesis. If the NLU results data includes an N-best list of NLU hypotheses, the NLU component and the orchestrator component 1030 may direct the top scoring NLU hypothesis to a skill component(s) 654 associated with the top scoring NLU hypothesis. The system may also include a post-NLU ranker which may incorporate other information to rank potential interpretations determined by the NLU component.

Figure 11:
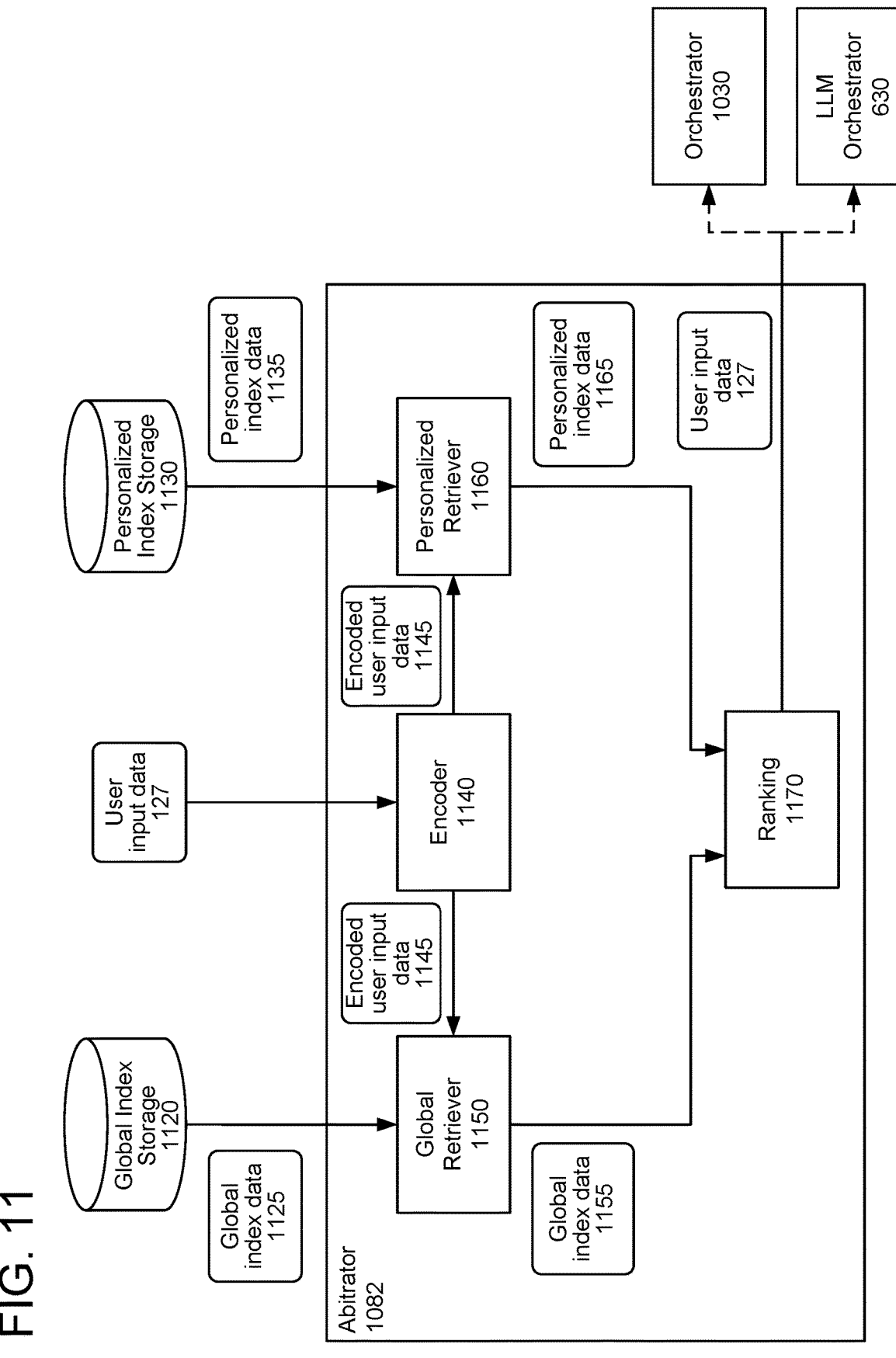
FIG. 11 is a conceptual diagram illustrating example processing of an arbitrator component, according to embodiments of the present disclosure.

FIG. 11 illustrates example components and processing of the arbitrator component 1082. As shown in FIG. 11, the arbitrator component 1082 may include an encoder component 1140, a global retriever component 1150, a personalized retriever component 1160, and a ranking component 1170. The arbitrator component 1082 may be in communication with a global index storage 1120 and a personalized index storage 1130. The arbitrator component 1082 may be configured to perform retrieval-based techniques based on a semantic vectorized representation of a user input and historical user inputs received by the system 100 over a period of time (e.g., past 30 days) to determine whether the orchestrator component 1030 or the LLM orchestrator component 630 or both of them should process with respect to the user input.

The user input data 127 may be received at the encoder component 1140 of the arbitrator component 1082. The encoder component 1140 may process the user input data 127 to generate encoded user input data 1145 represented an encoded representation of the user input data 127 (e.g., a vectorized representation of the user input). The encoder component may send the encoded user input data 1145 to the global retriever component 1150 and the personalized retriever component 1160. In some embodiments, the encoder component 1140 may be trained using techniques associated with Deep Structured Semantic Models (DSSM).

The global retriever component 1150 is configured to determine one or more historical user inputs that are similar to the user input data 127. The global retriever component 1150 queries a global index storage 1120 for global index data 1125 representing one or more historical user inputs that are semantically similar to the user input data 127. The global retriever component 1150 may include one or more historical user inputs received from various users over a period of time (e.g., 30 days). In some embodiments, the global index data 1125 may correspond to an encoded representation(s) of the historical user input(s). In such embodiments, the one or more historical user inputs that are semantically similar to the user input data 127 may be determined based on comparing the encoded user input data 1145 to the encoder representation(s) of the historical user input(s) (e.g., to determine a cosine similarity). The global retriever component 1150 may send the global index data 1125 to the ranking component 1170.

The personalized retriever component 1160 is configured to determine one or more historical user inputs that are similar to the user input data 127, where the one or more historical user inputs are associated with the user 105 that provided the user input corresponding to the user input data 127. The personalized retriever component 1160 queries a personalized index storage 1130 for personalized index data 1135 representing one or more historical user inputs that are semantically similar to the user input data 127 and were provided by the same user that provided the user input corresponding to the user input data 127. The personalized retriever component 1160 may include one or more historical user inputs received from the user corresponding to the user input data 127 over a period of time (e.g., 30 days). In some embodiments, the personalized index data 1135 may correspond to an encoded representation(s) of the historical user input(s). In such embodiments, the one or more historical user inputs that are semantically similar to the user input data 127 may be determined based on comparing the encoded user input data 1145 to the encoder representation(s) of the historical user input(s) (e.g., to determine a cosine similarity). The personalized retriever component 1160 may send the personalized index data 1135 to the ranking component 1170.

In some embodiments, the global index storage 1120 and/or the personalized index storage 1130 may further include metadata associated with the historical user inputs, which may be further included in the global index data 1125 and/or the personalized index data 1135. For example, the global index storage 1120 and/or the personalized index storage 1130 may further include a user satisfaction associated with a system-generated response to the user input, a value representing how many times the user input was received during the time period, a domain (e.g., routine, smart home, shopping, weather, etc.), etc.

In some embodiments, the global retriever component 1150 and/or the personalized retriever component 1160 may retrieve the global index data 1125 and/or the personalized index data 1135 semantically similar to the encoded user input data 1145 using Maximum Inner Product Search Solution.

The ranking component 1170 may process the global index data 1155 and the personalized index data 1165 to determine whether to send the user input data 127 to the orchestrator component 1030 and/or the LLM orchestrator component 630. In some embodiments, the ranking component 1170 may make such a determination based on the metadata included in the global index data 1155 and/or the personalized index data 1165. In some embodiments, the ranking component 1170 may be a rule-based component. In other embodiments, the ranking component 1170 may be an ML-based component (e.g., a decision tree, a classifier, an LLM, etc.). In embodiments where the ranking component 1170 is an LLM, the ranking component 1170 may be further configured to determine if there the user input is ambiguous, in which case the ranking component 1170 may generate a request for additional information to resolve the ambiguity.

In some embodiments, after determining that the orchestrator component 1030 and/or the LLM orchestrator component 630 should process with respect to the user input data 127, the ranking component 1170 may be configured to periodically determine whether the orchestrator component 1030 and/or the LLM orchestrator component 630 should continue processing with respect to the user input data 127. For example, after a particular point in the processing of the orchestrator component 1030 (e.g., after performing NLU, prior to determining a skill component 654 to process with respect to the user input data 127, prior to performing an action responsive to the user input, etc.) and/or the LLM orchestrator component 630 (e.g., after selecting a task to be completed, after receiving the action response data from the one or more components, after completing a task, prior to performing an action responsive to the user input, etc.) the orchestrator component 1030 and/or the LLM orchestrator component 630 may query the arbitrator component 1082 has determined that the orchestrator component 1030 and/or the LLM orchestrator component 630 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 1082 may cause the orchestrator component 1030 and/or the LLM orchestrator component 630 to begin processing with respect to a user input as soon as a portion of data associated with the user input data 127 is available (e.g., the ASR data, context data, output of the user recognition component 1095. Thereafter, once the arbitrator component 1082 has enough data to perform the processing described herein above to determine whether the orchestrator component 1030 and/or the LLM orchestrator component 630 is to process with respect to the user input, the arbitrator component 1082 may inform the corresponding component (e.g., the orchestrator component 1030 and/or the LLM orchestrator component 630) to continue/halt processing with respect to the user input at one of the logical checkpoints in the processing of the orchestrator component 1030 and/or the LLM orchestrator component 630.

As discussed herein above, in some embodiments, the LLM shortlister component 640 (e.g., via the API shortlister component 820 and/or the shortlister language model 840) may be configured to select the orchestrator component 1030 to process with respect to the user input and/or a current task to return action response data (e.g., the action response data 697a) representing a response to the user input/current task or a description of an action the orchestrator component 1030 may cause to be performed in response to the user input/current task. As such, in some embodiments, although the LLM orchestrator component 630 is determined to process with respect to a user input, the LLM orchestrator component 630 may determine, during such processing, that the orchestrator component 1030 should process with respect to the user input.

A skill system component(s) 1025 may communicate with a skill component(s) 654 within the system component(s) 120 directly with the orchestrator component 1030 and/or the action plan execution component 645, or with other components. A skill system component(s) 1025 may be configured to perform one or more actions. An ability to perform such action(s) may sometimes be referred to as a "skill." That is, a skill may enable a skill system component(s) 1025 to execute specific functionality in order to provide data or perform some other action requested by a user. For example, a weather service skill may enable a skill system component(s) 1025 to provide weather information to the system component(s) 120, a car service skill may enable a skill system component(s) 1025 to book a trip with respect to a taxi or ride sharing service, an order pizza skill may enable a skill system component(s) 1025 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 654 dedicated to interacting with the skill system component(s) 1025. Unless expressly stated otherwise, reference to a skill, skill device, or skill component may include a skill component 654 operated by the system component(s) 120 and/or skill operated by the skill system component(s) 1025. Moreover, the functionality described herein as a skill or skill may be referred to using many different terms, such as an action, bot, app, or the like. The skill component 654 and or skill system component(s) 1025 may return output data to the orchestrator component 1030.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 656. The TTS component 656 may generate audio data (e.g., synthesized speech) from text data using one or more different methods. Text data input to the TTS component 656 may come from a skill component 654, the orchestrator component 1030, or another component of the system. In one method of synthesis called unit selection, the TTS component 656 matches text data against a database of recorded speech. The TTS component 656 selects matching units of recorded speech and concatenates the units together to form audio data. In another method of synthesis called parametric synthesis, the TTS component 656 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 1011 representing the commands to the system component(s) 120 for processing, after which the system component(s) 120 may return output data that can cause the user device 110 to engage its camera.

The system component(s) 120 may include a user recognition component 1095 that recognizes one or more users using a variety of data. However, the disclosure is not limited thereto, and the user device 110 may include a user recognition component 1295 instead of and/or in addition to user recognition component 1095 of the system component(s) 120 without departing from the disclosure. User recognition component 1295 operates similarly to user recognition component 1095.

The user recognition component 1095 may take as input the audio data 1011 and/or text data output by the ASR component 1050. The user recognition component 1095 may perform user recognition by comparing audio characteristics in the audio data 1011 to stored audio characteristics of users. The user recognition component 1095 may also perform user recognition by comparing biometric data (e.g., fingerprint data, iris data, etc.), received by the system in correlation with the present user input, to stored biometric data of users assuming user permission and previous authorization. The user recognition component 1095 may further perform user recognition by comparing image data (e.g., including a representation of at least a feature of a user), received by the system in correlation with the present user input, with stored image data including representations of features of different users. The user recognition component 1095 may perform additional user recognition processes, including those known in the art.

The user recognition component 1095 determines scores indicating whether user input originated from a particular user. For example, a first score may indicate a likelihood that the user input originated from a first user, a second score may indicate a likelihood that the user input originated from a second user, etc. The user recognition component 1095 also determines an overall confidence regarding the accuracy of user recognition operations.

Output of the user recognition component 1095 may include a single user identifier corresponding to the most likely user that originated the user input. Alternatively, output of the user recognition component 1095 may include an N-best list of user identifiers with respective scores indicating likelihoods of respective users originating the user input. The output of the user recognition component 1095 may be used to inform processing of the arbitrator component 1082, the orchestrator component 1030, and/or the LLM orchestrator component 630 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 1075 that may be configured to detect a sentiment of a user from audio data representing speech/utterances from the user, image data representing an image of the user, and/or the like. The sentiment detection component 1075 may be included in system component(s) 120, as illustrated in FIG. 10, although the disclosure is not limited thereto and the sentiment detection component 1075 may be included in other components without departing from the disclosure. For example the sentiment detection component 1275 may be included in the user device 110, as a separate component, etc. Sentiment detection component 1275 may operate similarly to sentiment detection component 1075. The system component(s) may use the sentiment detection component 1075 to, for example, customize a response for a user based on an indication that the user is happy or frustrated.

Figure 12:
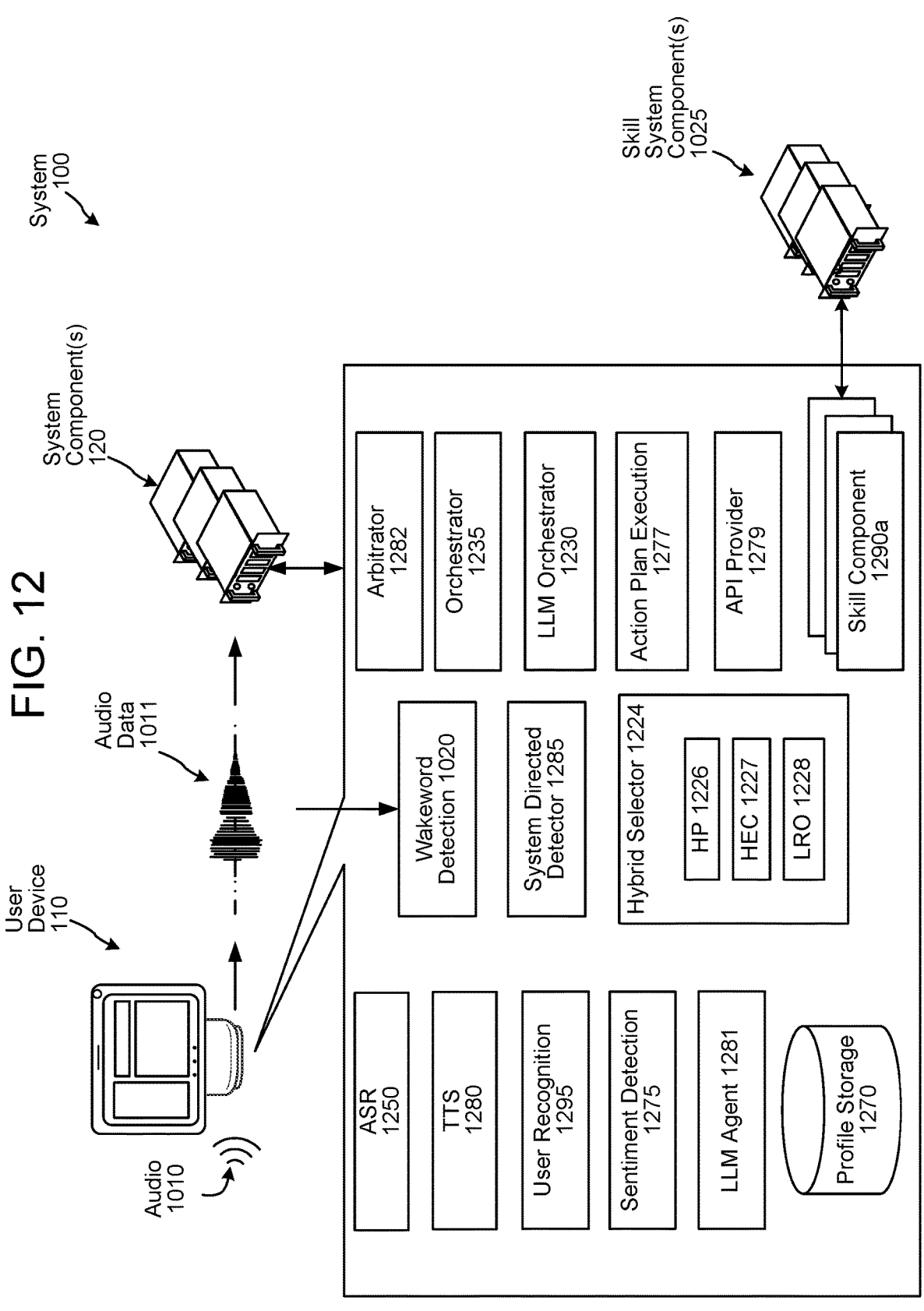
FIG. 12 is a conceptual diagram illustrating components that may be included in a device, according to embodiments of the present disclosure.

Although the components of FIG. 10 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 12 illustrates such a configured user device 110.

In at least some embodiments, the system component(s) may receive the audio data 1011 from the user device 110, to recognize speech corresponding to a spoken input in the received audio data 1011, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 1280) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 10, the user device 110 may include a wakeword detection component 1020 configured to compare the audio data 1011 to stored models used to detect a wakeword (e.g., "Alexa") that indicates to the user device 110 that the audio data 1011 is to be processed by the user device 110 (e.g., by the orchestrator component 1235 and/or the LLM orchestrator 1230, which are configured similar to the orchestrator component 1030 and the LLM orchestrator component 630, respectively). In at least some embodiments, a hybrid selector 1224, of the user device 110, may send the audio data 1011 to the wakeword detection component 1020. If the wakeword detection component 1020 detects a wakeword in the audio data 1011, the wakeword detection component 1020 may send an indication of such detection to the hybrid selector 1224. In response to receiving the indication, the hybrid selector 1224 may send the audio data 1011 to the system component(s) and/or the ASR component 1250. The wakeword detection component 1020 may also send an indication, to the hybrid selector 1224, representing a wakeword was not detected. In response to receiving such an indication, the hybrid selector 1224 may refrain from sending the audio data 1011 to the system component(s), and may prevent the ASR component 1250 from further processing the audio data 1011. In this situation, the audio data 1011 can be discarded.

The user device 110 may conduct its own speech processing using on-device language processing components. ASR component 1250 may operate similarly to ASR component 1050. The user device 110 may also internally include, or otherwise have access to, other components such as one or more skill components 1290 capable of executing commands based on the output of the orchestrator component 1030, the LLM orchestrator 630, or other results determined by the user device 110/system component(s) (which may operate similarly to skill components 654), an arbitrator component 1282 (configured to process in a similar manner to that discussed herein above with respect to the arbitrator component 1082), an action plan execution component 1277 (configured to process in a similar manner to that discussed herein with respect to the action plan execution component 645), an API provider component 1279 (configured to process in a similar manner to that discussed herein with respect to the API provider component 650), and LLM agent component 1281 (configured to process in a similar manner to that discussed herein with respect to the LLM agent component 652), a user recognition component 1295 (configured to process in a similar manner to that discussed herein with respect to the user recognition component 1095 of the system component(s)), profile storage 1270 (configured to store similar profile data to that discussed herein with respect to the profile storage 1070 of the system component(s)), or other components. In at least some embodiments, the profile storage 1270 may only store profile data for a user or group of users specifically associated with the user device 110. Similar to as described above with respect to skill component 654, a skill component 1290 may communicate with a skill system component(s) 1025. The user device 110 may also have its own TTS component 1280, which may operate similarly to TTS component 656.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 1224, of the user device 110, may include a hybrid proxy (HP) 1226 configured to proxy traffic to/from the system component(s). For example, the HP 1226 may be configured to send messages to/from a hybrid execution controller (HEC) 1227 of the hybrid selector 1224. For example, command/directive data received from the system component(s) can be sent to the HEC 1227 using the HP 1226. The HP 1226 may also be configured to allow the audio data 1011 to pass to the system component(s) while also receiving (e.g., intercepting) this audio data 1011 and sending the audio data 1011 to the HEC 1227.

In at least some embodiments, the hybrid selector 1224 may further include a local request orchestrator (LRO) 1228 configured to notify the ASR component 1250 about the availability of new audio data 1011 that represents user speech, and to otherwise initiate the operations of local language processing when new audio data 1011 becomes available. In general, the hybrid selector 1224 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 1011 is received, the HP 1226 may allow the audio data 1011 to pass through to the system component(s) and the HP 1226 may also input the audio data 1011 to the on-device ASR component 1250 by routing the audio data 1011 through the HEC 1227 of the hybrid selector 1224, whereby the LRO 1228 notifies the ASR component 1250 of the audio data 1011. At this point, the hybrid selector 1224 may wait for response data from either or both of the system component(s) or the local language processing components. However, the disclosure is not limited thereto, and in some examples the hybrid selector 1224 may send the audio data 1011 only to the local ASR component 1250 without departing from the disclosure. For example, the user device 110 may process the audio data 1011 locally without sending the audio data 1011 to the system component(s).

The local ASR component 1250 is configured to receive the audio data 1011 from the hybrid selector 1224, and to recognize speech in the audio data 1011. The user device 110 and/or the system component(s) may associate a unique identifier with each natural language user input. The user device 110 may include the unique identifier when sending the audio data 1011 to the system component(s), and the response data from the system component(s) may include the unique identifier to identify which natural language user input the response data corresponds.

In at least some embodiments, the user device 110 may include, or be configured to use, one or more skill components 1290 that may work similarly to the skill component(s) 654 implemented by the system component(s). The skill component(s) 1290 may correspond to one or more domains that are used in order to determine how to act on a spoken input in a particular way, such as by outputting a directive that corresponds to the determined intent, and which can be processed to implement the desired operation. The skill component(s) 1290 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 1025. For example, a skill system component(s) 1025 may be located in a remote environment (e.g., separate location) such that the user device 110 may only communicate with the skill system component(s) 1025 via the network(s) 199. However, the disclosure is not limited thereto. For example, in at least some embodiments, a skill system component(s) 1025 may be configured in a local environment (e.g., home server and/or the like) such that the user device 110 may communicate with the skill system component(s) 1025 via a private network, such as a local area network (LAN).

As used herein, a "skill" may refer to a skill component 1290, a skill system component(s) 1025, or a combination of a skill component 1290 and a corresponding skill system component(s) 1025.

Similar to the manner discussed with regard to FIG. 10, the local user device 110 may be configured to recognize multiple different wakewords and/or perform different categories of tasks depending on the wakeword. Such different wakewords may invoke different processing components of local user device 110 (not illustrated in FIG. 12). For example, detection of the wakeword "Alexa" by the wakeword detection component 1020 may result in sending audio data to certain language processing components 1292/skill components 1290 for processing while detection of the wakeword "Computer" by the wakeword detector may result in sending audio data different language processing components 1292/skill components 1290 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
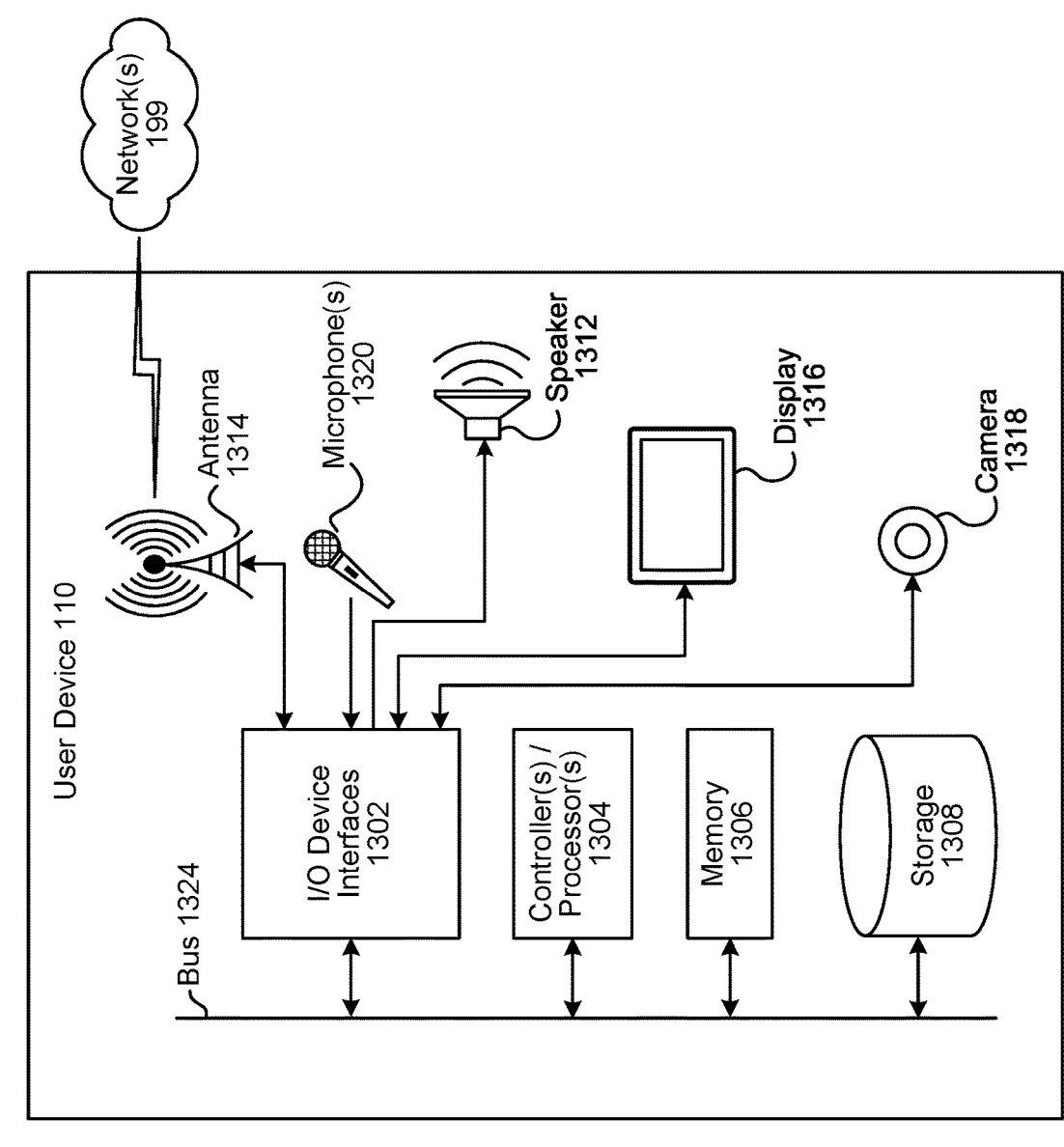
FIG. 13 is a block diagram conceptually illustrating example components of a device according to embodiments of the present disclosure.

FIG. 13 is a block diagram conceptually illustrating a device 110 that may be used with the system. FIG. 14 is a block diagram conceptually illustrating example components of a remote device, such as the system component(s) 120, which may assist with ASR processing, NLU processing, etc., and the skill support system(s) 1025. A system (120/1025) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/1025) may be included in the overall system of the present disclosure, such as one or more system components 120 for performing ASR processing, one or more system components 120 for performing NLU processing, one or more skill systems 1025 for performing actions responsive to user inputs, etc. In operation, each of these systems may include computer-readable and computer-executable instructions that reside on the respective device (120/1025), as will be discussed further below.

Each of these devices (110/120/1025) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/1025) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/1025) may also be connected to removable or external non-volatile memory and/or storage (such as a removable memory card, memory key drive, networked storage, etc.) through respective input/output device interfaces (1302/1402).

Computer instructions for operating each device (110/120/1025) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/1025) includes input/output device interfaces (1302/1402). A variety of components may be connected through the input/output device interfaces (1302/1402), as will be discussed further below. Additionally, each device (110/120/1025) may include an address/data bus (1324/1424) for conveying data among components of the respective device. Each component within a device (110/120/1025) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system component(s) 120, or the skill support system(s) 1025 may include their own dedicated processors, memory, and/or storage. Alternatively, one or more of the components of the device(s) 110, the system component(s) 120, or the skill support system(s) 1025 may utilize the I/O interfaces (1302/1402), processor(s) (1304/1404), memory (1306/1406), and/or storage (1308/1408) of the device(s) 110, system component(s) 120, or the skill support system(s) 1025, respectively. Thus, the ASR component 1050 may have its own I/O interface(s), processor(s), memory, and/or storage; the LLM orchestrator component 630 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 1025, as described herein, are illustrative, and may be located as a stand-alone device or may be included, in whole or in part, as a component of a larger device or system.

Figure 15:
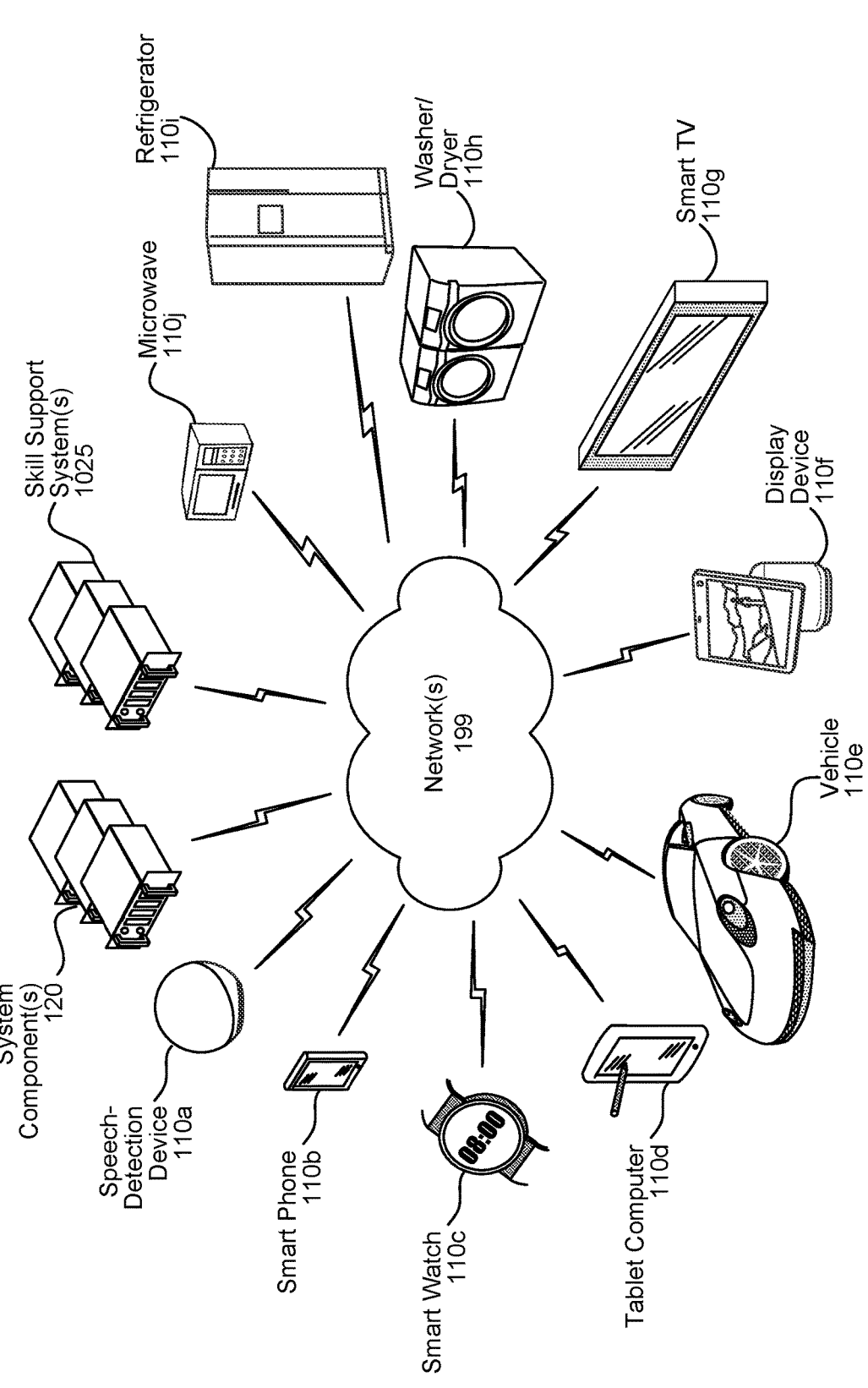
FIG. 15 illustrates an example of a computer network for use with the speech processing system.

As illustrated in FIG. 15, multiple devices (110a-110j, 120, 1025) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 1025, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the one or more system components 120.

The concepts disclosed herein may be applied within a number of different devices and computer systems, includ-ing, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combi-nations of components or steps, and still achieve the benefits and advantages of the present disclosure. Moreover, it should be apparent to one skilled in the art, that the disclo-sure may be practiced without some or all of the specific details and steps disclosed herein.

Aspects of the disclosed system may be implemented as a computer method or as an article of manufacture such as a memory device or non-transitory computer readable stor-age medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be imple-mented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodi-ments necessarily include logic for deciding, with or without other input or prompting, whether these features, elements, and/or steps are included or are to be performed in any particular embodiment. The terms "comprising," "includ-ing," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive lan-guage is not generally intended to, and should not, imply that certain embodiments require at least one of X, at least one of Y, or at least one of Z to each be present.

As used in this disclosure, the term "a" or "one" may include one or more items unless specifically stated other-wise. Further, the phrase "based on" is intended to mean "based at least in part on" unless specifically stated other-wise.

What is claimed is:

1. A computer-implemented method comprising:

receiving first audio data representing a first spoken input;

determining first context data corresponding to the first spoken input, the first context data including at least previous user input data, first device information for a first device that received the first spoken input, and a first time the first spoken input is detected;

determining, using a first machine learning model, a first key representing the first context data, the first key to be used to perform a lookup in a cache storing outputs previously generated by a large language model (LLM);

performing a lookup for the first key in the cache to determine that the cache does not include the first key;

performing automatic speech recognition (ASR) processing using the first audio data to determine first user input data corresponding to the first spoken input;

based on determining that the cache does not include the first key, processing, using the LLM, the first context data and the first user input data to generate a first output corresponding to the first spoken input; and causing presentation of the first output.

2. The computer-implemented method of claim 1, further comprising:

determining an amount of time that the LLM uses to process the first user input data and the first context data;

processing, using a second machine learning model, at least the first user input data, the first context data and the amount of time, to determine that the first output is to be stored in the cache, wherein the second machine learning model is configured to determine storage of output in the cache based on a frequency of receiving a user input, a predicted amount of time for the LLM to process a user input, and available memory in the cache; and based on the second machine learning model determining that the first output is to be stored in the cache, storing, in the cache, the first output associated with the first key.

3. The computer-implemented method of claim 1, further comprising:

receiving second audio data representing a second spoken input;

determining second context data corresponding to the second spoken input, the second context data including at least second user input data corresponding to a third spoken input received prior to the second spoken input, second device information for a second device that received the second spoken input, and second time information corresponding to a second time the first spoken input is detected;

determining, using the first machine learning model, a second key corresponding to the second context data;

using the second key, performing a lookup in the cache to determine second output associated with the second key; and causing presentation of the second output in response to the third spoken input.

4. The computer-implemented method of claim 1, further comprising:

receiving second audio data representing a third spoken input;

determining second context data corresponding to the third spoken input, the second context data including at least third user input data corresponding to a fourth spoken input received prior to the third spoken input, second device information for a second device that received the third spoken input, and second time the third spoken input is received;

determining, using the first machine learning model, a second key corresponding to the second context data;

using the second key, performing a lookup in the cache to determine that the cache does not include the second key;

performing ASR processing using the second audio data to determine third user input data corresponding to the third spoken input;

based on determining that the cache does not include the second key, processing, using the LLM, the second context data and the third user input data;

after a period of time has elapsed, determining a partial output based on processing by the LLM of the second context data and the third user input data, the partial output representing model data and being different than a natural language response; and storing, in the cache, the partial output associated with the second key.

5. A computer-implemented method comprising:

determining first context data including at least first user input data corresponding to a previously received first user input;

determining, using a first machine learning model, a first key representing the first context data, the first key to be used to perform a lookup in a cache storing outputs previously generated by a generative model;

performing a lookup for the first key in the cache to determine that the cache does not include the first key;

receiving second user input data corresponding to a second user input received after the first user input data;

based on determining that the cache does not include the first key, processing, using the generative model, the first context data and the second user input data to generate a first output corresponding to the second user input; and causing presentation of the first output.

6. The computer-implemented method of claim 5, further comprising:

processing, using a second machine learning model, at least the second user input data and the first context data, to determine that the first output is to be stored in the cache, wherein the second machine learning model is configured to determine storage of output in the cache based on a frequency of receiving a user input, a predicted amount of time for the generative model to process a user input, and available memory in the cache; and based on the second machine learning model determining that the first output is to be stored in the cache, storing, in the cache, the first output associated with the first key.

7. The computer-implemented method of claim 5, further comprising:

determining an amount of time that the generative model uses to process the second user input data and the first context data;

processing, using a second machine learning model, at least the second user input data and the amount of time, to determine that the first output is to be stored in the cache, wherein the second machine learning model is configured to determine storage of output in the cache based on a frequency of receiving a user input, a predicted amount of time for the generative model to process a user input, and available memory in the cache; and based on the second machine learning model determining that the first output is to be stored in the cache, storing, in the cache, the first output associated with the first key.

8. The computer-implemented method of claim 5, further comprising:

determining second context data including at least third user input data corresponding to a third user input, second device information for a second device that received the third user input data, and second time the third user input is received;

determining, using the first machine learning model, a second key corresponding to the second context data;

using the second key, performing a lookup in the cache to determine second output associated with the second key;

receiving a fourth user input after the third user input, wherein the second context data corresponds to the fourth user input; and causing presentation of the second output in response to the fourth user input.

9. The computer-implemented method of claim 5, further comprising:

determining second context data including at least third user input data corresponding to a third user input, second device information for a second device that received the third user input data, and second time the third user input is received;

determining, using the first machine learning model, a second key corresponding to the second context data;

using the second key, performing a lookup in the cache to determine that the cache does not include the second key;

receiving fourth user input data corresponding to a fourth user input;

based on determining that the cache does not include the second key, processing, using the generative model, the second context data and the fourth user input data;

after a first period of time has elapsed, determining that processing by the generative model is incomplete; and determining a second output responsive to the fourth user input using another component.

10. The computer-implemented method of claim 9, further comprising:

processing, using a second machine learning model, at least the fourth user input data and the second context data, to determine that a third output based on processing by the generative model is to be stored in the cache, wherein the second machine learning model is configured to determine storage of output in the cache based on a frequency of receiving a user input, a predicted amount of time for the generative model to process a user input, and available memory in the cache;

based on the second machine learning model determining that the third output is to be stored in the cache and after a second period of time has elapsed, determining the third output based on processing of the fourth user input data and the second context data by the generative model; and storing, in the cache, the third output associated with the second key.

11. The computer-implemented method of claim 10, wherein:

the third output is a partial output representing model data and being different than a natural language response, and storing the third output comprises storing, in the cache, the partial output associated with the second key.

12. The computer-implemented method of claim 9, further comprising:

processing, using a second machine learning model, at least the fourth user input data and the second context data, to determine that a third output based on processing by the generative model is not to be stored in the cache, wherein the second machine learning model is configured to determine storage of output in the cache based on a frequency of receiving a user input, a predicted amount of time for the generative model to process a user input, and available memory in the cache; and based on the second machine learning model determining that the third output is not to be stored in the cache, ceasing processing by the generative model of the second context data and the fourth user input data.

13. A system comprising:

at least one processor; and at least one memory including instructions that, when executed by the at least one processor, cause the system to:

determine first context data including at least first user input data corresponding to a previously received first user input;

determine, using a first machine learning model, a first key representing the first context data, the first key to be used to perform a lookup in a cache storing outputs previously generated by a generative model;

perform a lookup for the first key in the cache to determine that the cache does not include the first key;

receive second user input data corresponding to a second user input received after the first user input data;

based on determining that the cache does not include the first key, process, using the generative model, the first context data and the second user input data to generate a first output corresponding to the second user input; and cause presentation of the first output.

14. The system of claim 13, wherein the at least one memory includes further instructions that, when executed by the at least one processor, further cause the system to:

process, using a second machine learning model, at least the second user input data and the first context data, to determine that the first output is to be stored in the cache, wherein the second machine learning model is configured to determine storage of output in the cache based on a frequency of receiving a user input, a predicted amount of time for the generative model to process a user input, and available memory in the cache; and based on the second machine learning model determining that the first output is to be stored in the cache, store, in the cache, the first output associated with the first key.

15. The system of claim 13, wherein the at least one memory includes further instructions that, when executed by the at least one processor, further cause the system to:

determine an amount of time that the generative model uses to process the second user input data and the first context data;

process, using a second machine learning model, at least the second user input data and the amount of time, to determine that the first output is to be stored in the cache, wherein the second machine learning model is configured to determine storage of output in the cache based on a frequency of receiving a user input, a predicted amount of time for the generative model to process a user input, and available memory in the cache; and based on the second machine learning model determining that the first output is to be stored in the cache, store, in the cache, the first output associated with the first key.

16. The system of claim 13, wherein the at least one memory includes further instructions that, when executed by the at least one processor, further cause the system to:

determine second context data including at least third user input data corresponding to a third user input, second device information for a second device that received the third user input data, and second time the third user input is received;

determine, using the first machine learning model, a second key corresponding to the second context data;

using the second key, perform a lookup in the cache to determine second output associated with the second key;

receive a fourth user input after the third user input, wherein the second context data corresponds to the fourth user input; and cause presentation of the second output in response to the fourth user input.

17. The system of claim 13, wherein the at least one memory includes further instructions that, when executed by the at least one processor, further cause the system to:

determine second context data including at least third user input data corresponding to a third user input, second device information for a second device that received the third user input data, and second time the third user input is received;

determine, using the first machine learning model, a second key corresponding to the second context data;

using the second key, perform a lookup in the cache to determine that the cache does not include the second key;

receive fourth user input data corresponding to a fourth user input;

based on determining that the cache does not include the second key, process, using the generative model, the second context data and the fourth user input data;

after a first period of time has elapsed, determine that processing by the generative model is incomplete; and determine a second output responsive to the fourth user input using another component.

18. The system of claim 17, wherein the at least one memory includes further instructions that, when executed by the at least one processor, further cause the system to:

process, using a second machine learning model, at least the fourth user input data and the second context data, to determine that a third output based on processing by the generative model is to be stored in the cache, wherein the second machine learning model is configured to determine storage of output in the cache based on a frequency of receiving a user input, a predicted amount of time for the generative model to process a user input, and available memory in the cache;

based on the second machine learning model determining that the third output is to be stored in the cache and after a second period of time has elapsed, determine the third output based on processing of the fourth user input data and the second context data by the generative model; and store, in the cache, the third output associated with the second key.

19. The system of claim 18, wherein the third output is a partial output representing model data and being different than a natural language response, and wherein the at least one memory includes further instructions that, when executed by the at least one processor, further cause the system to:

store the third output comprises storing, in the cache, the partial output associated with the second key.

20. The system of claim 17, wherein the at least one memory includes further instructions that, when executed by the at least one processor, further cause the system to:

process, using a second machine learning model, at least the fourth user input data and the second context data, to determine that a third output based on processing by the generative model is not to be stored in the cache, wherein the second machine learning model is configured to determine storage of output in the cache based on a frequency of receiving a user input, a predicted amount of time for the generative model to process a user input, and available memory in the cache; and based on the second machine learning model determining that the third output is not to be stored in the cache, cease processing by the generative model of the second context data and the fourth user input data.

\* \* \* \* \*